(12) United States Patent
Miyake et al.

(10) Patent No.: US 10,232,648 B2
(45) Date of Patent: Mar. 19, 2019

(54) RECORDING APPARATUS

(71) Applicant: SEIKO EPSON CORPORATION, Tokyo (JP)

(72) Inventors: Toshio Miyake, Shiojiri (JP); Eiji Taketsugu, Matsumoto (JP); Masachika Nagase, Nirasaki (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/887,440

(22) Filed: Feb. 2, 2018

(65) Prior Publication Data

US 2018/0244081 A1    Aug. 30, 2018

(30) Foreign Application Priority Data

Feb. 24, 2017   (JP) ................. 2017-033443

(51) Int. Cl.
| | | |
|---|---|---|
| *B41J 11/44* | (2006.01) | |
| *G01D 5/347* | (2006.01) | |
| *G01D 11/00* | (2006.01) | |
| *G01D 13/04* | (2006.01) | |
| *B41J 2/01* | (2006.01) | |
| *G01D 13/02* | (2006.01) | |

(52) U.S. Cl.
CPC ............. *B41J 11/44* (2013.01); *B41J 2/01* (2013.01); *G01D 5/3473* (2013.01); *G01D 5/34707* (2013.01); *G01D 5/34715* (2013.01); *G01D 11/00* (2013.01); *G01D 13/02* (2013.01); *G01D 13/04* (2013.01)

(58) Field of Classification Search
CPC ......... B41J 2/01; B41J 11/44; G01D 5/34707; G01D 5/34715; G01D 5/3473; G01D 11/00; G01D 13/02; G01D 13/04
See application file for complete search history.

(56) References Cited

U.S. PATENT DOCUMENTS

| | | | | |
|---|---|---|---|---|
| 6,042,098 A | * | 3/2000 | Kubota | .................... B42C 1/12 270/58.02 |
| 6,634,729 B1 | * | 10/2003 | Schuman | .................. B41J 3/28 347/2 |
| 6,784,417 B2 | * | 8/2004 | Sonoki | ............... G01D 5/34715 250/231.13 |
| 8,517,501 B2 | * | 8/2013 | Ogura | ................ G01D 5/34715 347/19 |
| 9,417,101 B2 | * | 8/2016 | Nagura | .............. G01D 5/34746 |
| 2007/0040863 A1 | | 2/2007 | Nakajima et al. | |
| 2010/0073423 A1 | | 3/2010 | Nakata et al. | |

FOREIGN PATENT DOCUMENTS

| | | |
|---|---|---|
| JP | 2007-050560 A | 3/2007 |
| JP | 2010-069752 A | 4/2010 |

* cited by examiner

*Primary Examiner* — Anh T. N. Vo
(74) *Attorney, Agent, or Firm* — Workman Nydegger

(57) ABSTRACT

A printer includes an encoder scale having a reading region that is read by an encoder that detects a motion of a transport driving roller, and an anti-static unit having an anti-static brush that is in contact with the encoder scale and a base that supports the anti-static brush, wherein the anti-static brush is in contact with a region of the encoder scale other than the reading region.

9 Claims, 19 Drawing Sheets

FIG. 19
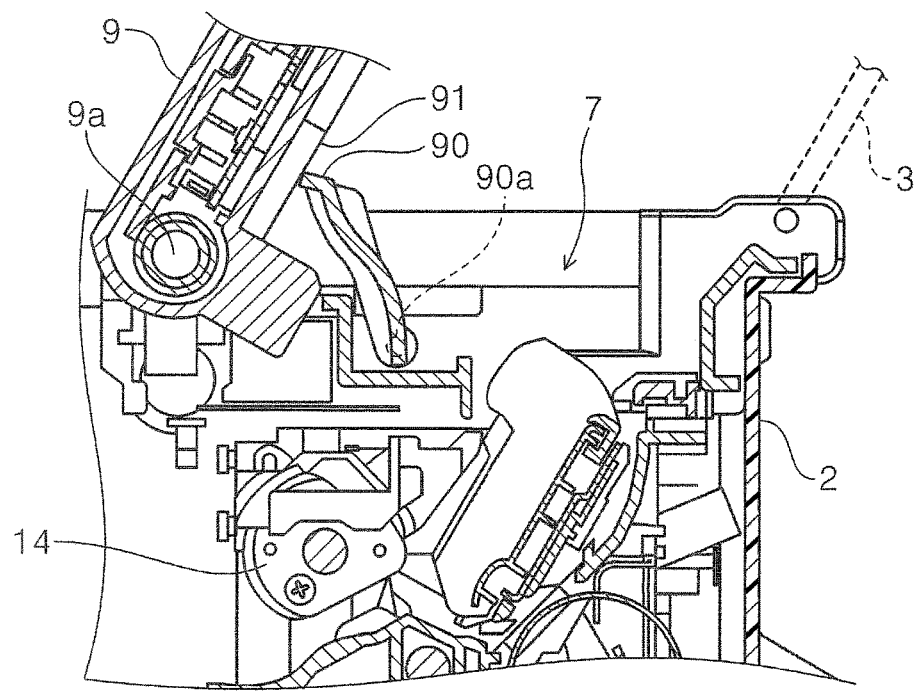
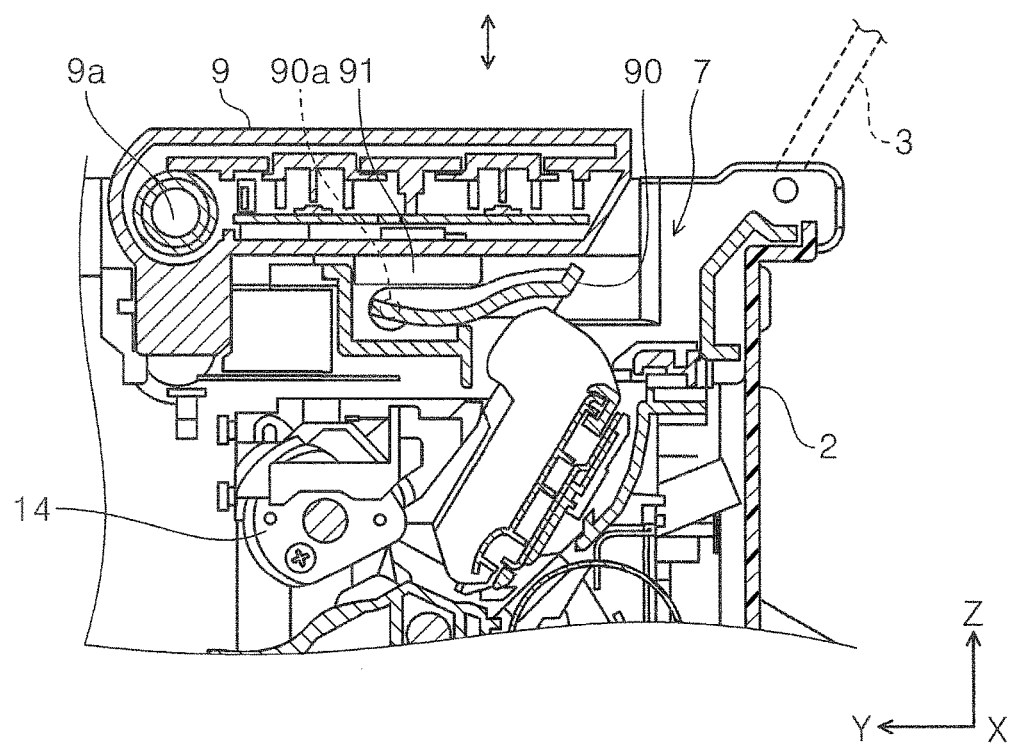

RECORDING APPARATUS

BACKGROUND

1. Technical Field

The present invention relates to recording apparatuses that perform recording onto a medium.

2. Related Art

As disclosed in JP-A-2010-069752, a recording apparatus such as an ink jet printer may include an encoder and an encoder scale that is read by the encoder in order to detect the motion amount of a transport roller or the like driven by a driving source such as a motor, or detect the motion amount of a carriage that carries a recording head that ejects ink and is configured to reciprocate by the driving source.

A mobile type recording apparatus, which is small-sized, lightweight, and easy to carry may be used outdoor as well as indoor. In the outdoor environment, more dust and particles are present than indoor. In addition to that, since the apparatus may be exposed to wind, dust and particles may easily enter the apparatus, causing failures of the apparatus.

For example, if the dust and particles which enter the apparatus are attached to the encoder scale, detection accuracy of the encoder for the motion amount of various components is lowered. According to JP-A-2010-069752, a carriage belt 64 as a movement mechanism for a carriage 61 is electrically neutralized in order to prevent attachment of ink mist to a linear scale 321 (corresponding to the encoder scale) disposed adjacent to the carriage belt 64. However, if the encoder scale itself is electrically charged, there still remains a risk that dust and particles as well as ink mist are attracted to the encoder scale.

SUMMARY

An advantage of some aspects of the invention is to prevent an encoder scale from being electrically charged to thereby reduce or eliminate a risk that dust and particles are attracted and attached to the encoder scale.

In order to solve the above problem, a recording apparatus according to a first aspect of the invention includes a recording section that performs recording onto a medium transported, an encoder that detects a motion of a movable section that operates during recording performed by the recording section onto a medium, an encoder scale having a reading region that is read by the encoder, and an anti-static unit having an anti-static brush that is in contact with the encoder scale and a base that holds the anti-static brush, wherein the anti-static brush is in contact with a portion of the encoder scale other than the reading region. According to this configuration, the encoder scale can be easily grounded with a simple configuration.

In the above aspect of the invention, the recording apparatus includes a main body frame that constitutes an apparatus main body having the recording section, and a sheet metal member that holds at least part of the base between the main body frame and the sheet metal member and is fixed to the main body frame. According to this configuration, the anti-static unit can be reliably attached to the main body frame.

In the above aspect of the invention, the base is attached to the main body frame by an adhesive material having adhesiveness, and the sheet metal member includes a fixation unit that holds part of the base between the main body frame and the sheet metal member and is fixed to the main body frame by a fastener, and an elastic portion that is biased toward the main body frame to press part of the base other than the portion held between the main body frame and the fixation unit.

If the fixation unit holding the base between the main body frame and the fixation unit is fastened by a fastener such as a screw, the base may be rotated or twisted by fastening operation. If the base is twisted, the positional accuracy of the anti-static brush is lowered. On the other hand, if the base is attached to the main body frame via the adhesive material having adhesiveness, the anti-static brush can be easily positioned but the adhesive material may be peeled off.

According to this configuration, a site of the base held between the main body frame and the fixation unit which is fixed to the main body frame by the fastener is a portion of the base, and the anti-static unit can be reliably attached to the main body frame by fixing a portion of the anti-static brush having little effect on the positional accuracy by using the fixation unit. Further, a portion of the base other than the site held between the fixation unit and the main body frame is pressed by the elastic portion biased toward the main body frame, which can prevent the adhesive material from being peeled off. Further, since the base is configured to be simply pressed by the elastic portion, the base can be prevented from being twisted unlike the case of using the fastener.

In the above aspect of the invention, the recording apparatus includes a holder to which the base is attached via an adhesive material, wherein the anti-static unit is attached to the apparatus main body with the holder interposed therebetween.

According to this configuration, since the recording apparatus includes the holder to which the base is attached via an adhesive material, wherein the anti-static unit is attached to the apparatus main body with the holder interposed therebetween, a degree of freedom in design such as arrangement and shape of the anti-static unit and the main body frame is increased.

In the above aspect of the invention, the holder includes a guide that guides a tip of the anti-static brush toward the encoder scale.

According to this configuration, the tip of the anti-static brush can be reliably in contact with the encoder scale.

In the above aspect of the invention, the encoder scale is formed as a disc shaped rotary body.

According to this configuration, the recording apparatus having the encoder scale formed as a disc shaped rotary body, that is, a so-called rotary encoder scale can achieve any of the effects described in the above aspects.

In the above aspect of the invention, the reading region of the encoder scale is provided in a circumferential direction, and a contact position of the anti-static brush with the encoder scale is provided inside the reading region. According to this configuration, the anti-static unit can be easily in contact with the encoder scale.

In the above aspect of the invention, the encoder scale is rotatable in a first direction and a second direction opposite to the first direction, and the anti-static brush is disposed at an orientation that does not interfere with the encoder scale rotating in either the first direction or the second direction.

According to this configuration, since the anti-static brush is disposed at an orientation that does not interfere with the encoder scale rotating in either the first direction or the second direction, the encoder scale can smoothly rotate in both the first direction and the second direction.

In the above aspect of the invention, the recording apparatus includes a medium support section that supports the medium and at least partially faces the recording section, a plurality of support ribs disposed on the medium support section and has a support surface for the medium, the support ribs being disposed spaced from each other in a width direction which is perpendicular to a medium transport direction, and an absorbing member disposed downstream to the plurality of the support ribs in the medium transport direction to absorb the liquid ejected from the recording section, wherein at least one support rib includes a channel which extends in the medium transport direction on the support surface, and the absorbing member includes a notch at a position corresponding to the support rib having a channel in the width direction on an upstream side in the medium transport direction.

Since the channel extending the medium transport direction is formed on the support surface of the support rib, paper dust may accumulate in the channel. When a certain amount of paper dust accumulates in the channel, it may be dragged by the paper sheet transported on the support surface and fall downstream in the transport direction. If a lump of paper dust falls on the absorbing member on the downstream side in the medium transport direction, the liquid which has been absorbed in the absorbing member is absorbed by the lump of paper dust, and may smudge the medium transported. According to this configuration, the absorbing member includes a notch at a position corresponding to the support rib having the channel in the width direction on the upstream side in the medium transport direction. Accordingly, when paper dust which accumulates in the channel falls on the downstream side in the transport direction, a risk that the paper dust is directly in contact with the absorbing member can be reduced. As a result, a risk that the paper dust which falls from the channel absorbs the liquid that has been absorbed in the absorbing member can be reduced or prevented, thereby reducing a risk of smudging the medium transported.

BRIEF DESCRIPTION OF THE DRAWINGS

The invention will be described with reference to the accompanying drawings, wherein like numbers reference like elements.

FIG. 19 is a view which illustrates a closing operation of the flap in coordination with a closing operation of the panel unit.

DESCRIPTION OF EXEMPLARY EMBODIMENTS

Example 1

Figure 1:
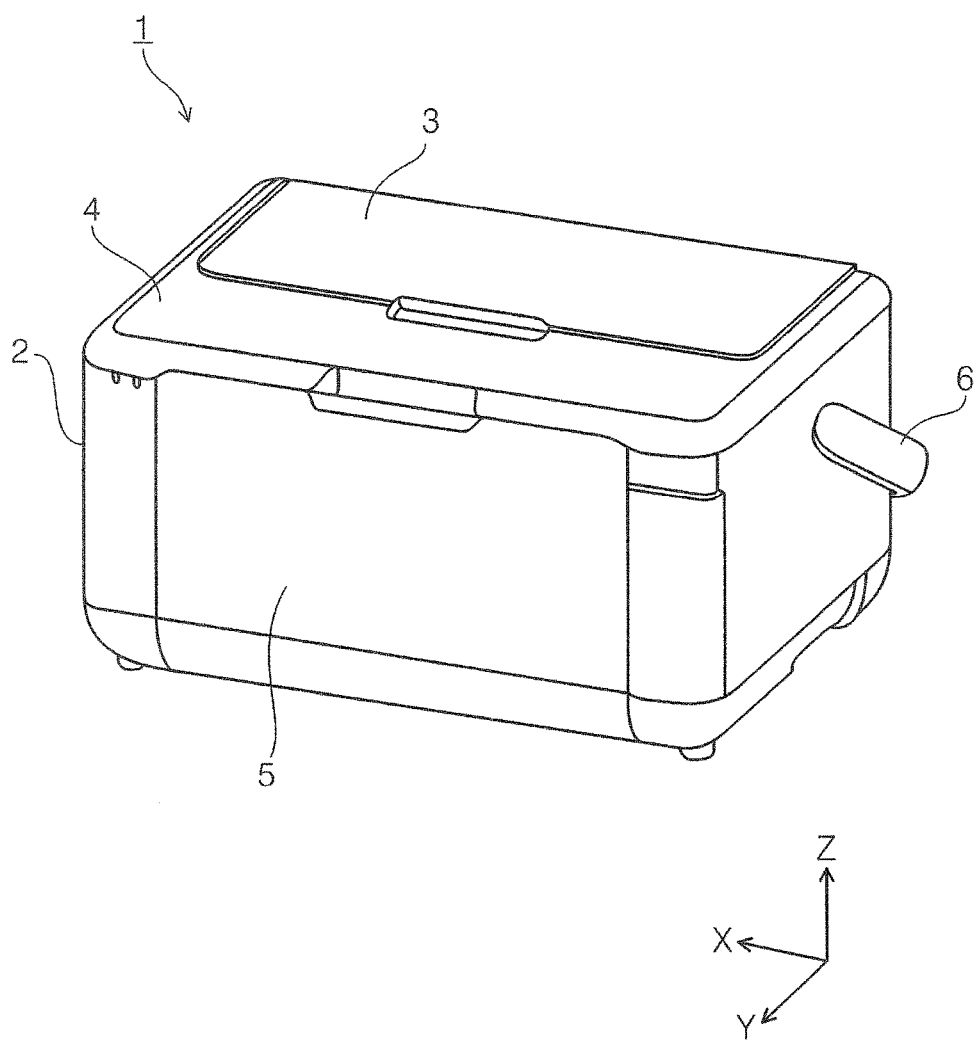
FIG. 1 is an outer appearance perspective view which illustrates an example of a printer according to the invention.
Figure 2:
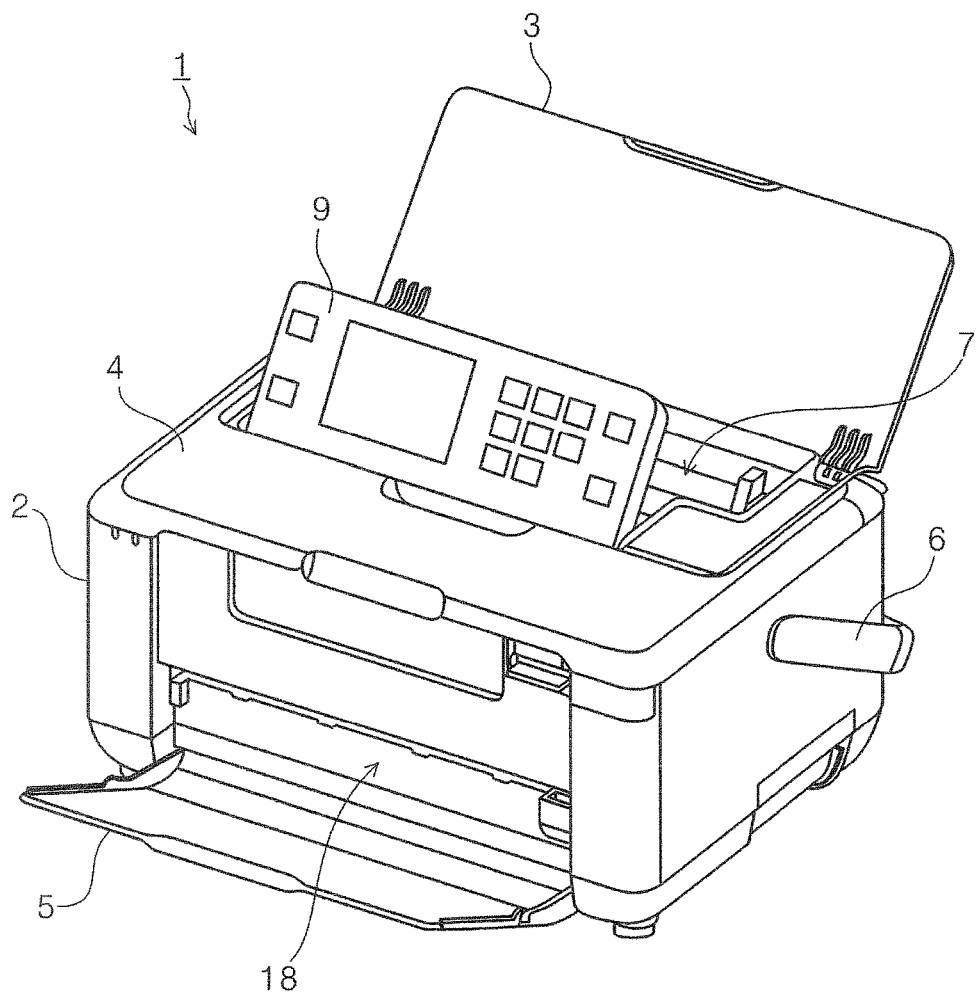
FIG. 2 is a perspective view of the printer according to the invention, in which a first top cover and a paper output cover are open and a panel unit is pulled up.
Figure 3:
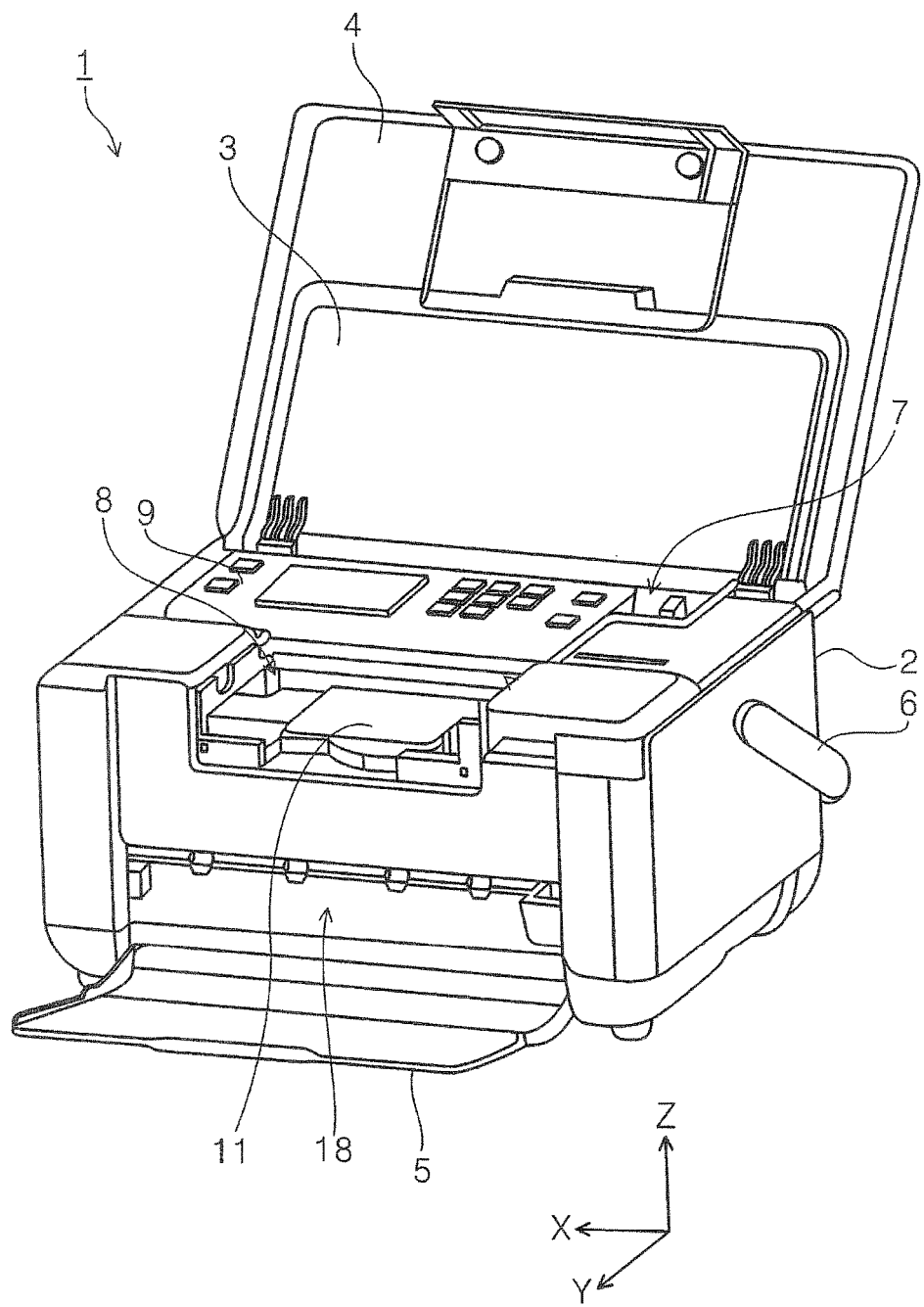
FIG. 3 is a perspective view of the printer according to the invention, in which a first top cover, a second top cover, and a paper output cover are open.
Figure 4:
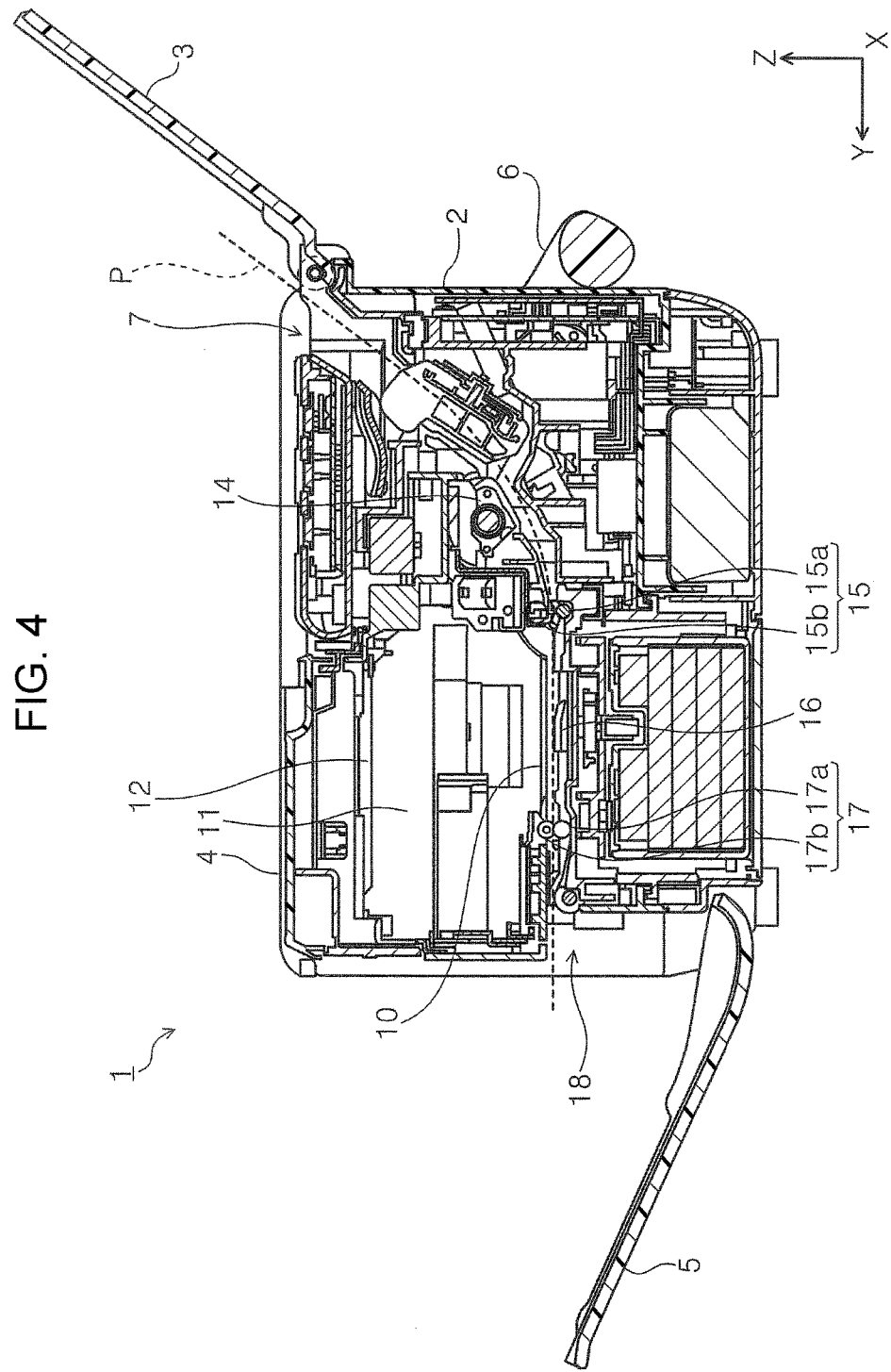
FIG. 4 is a side cross-sectional view which illustrates a sheet transport path of the printer according to the invention.
Figure 5:
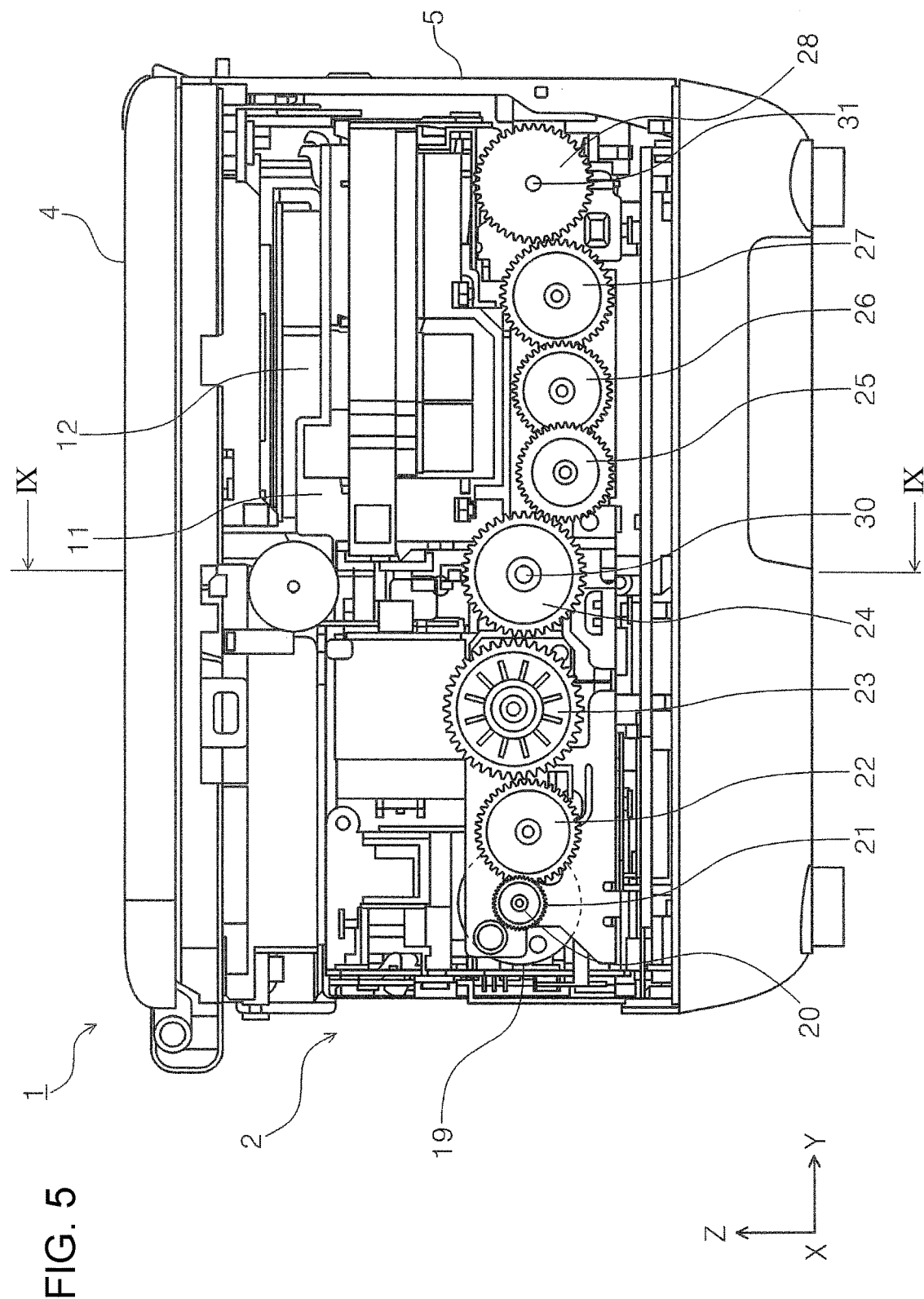
FIG. 5 is an inner configuration view in +X axis direction of an apparatus main body.
Figure 6:
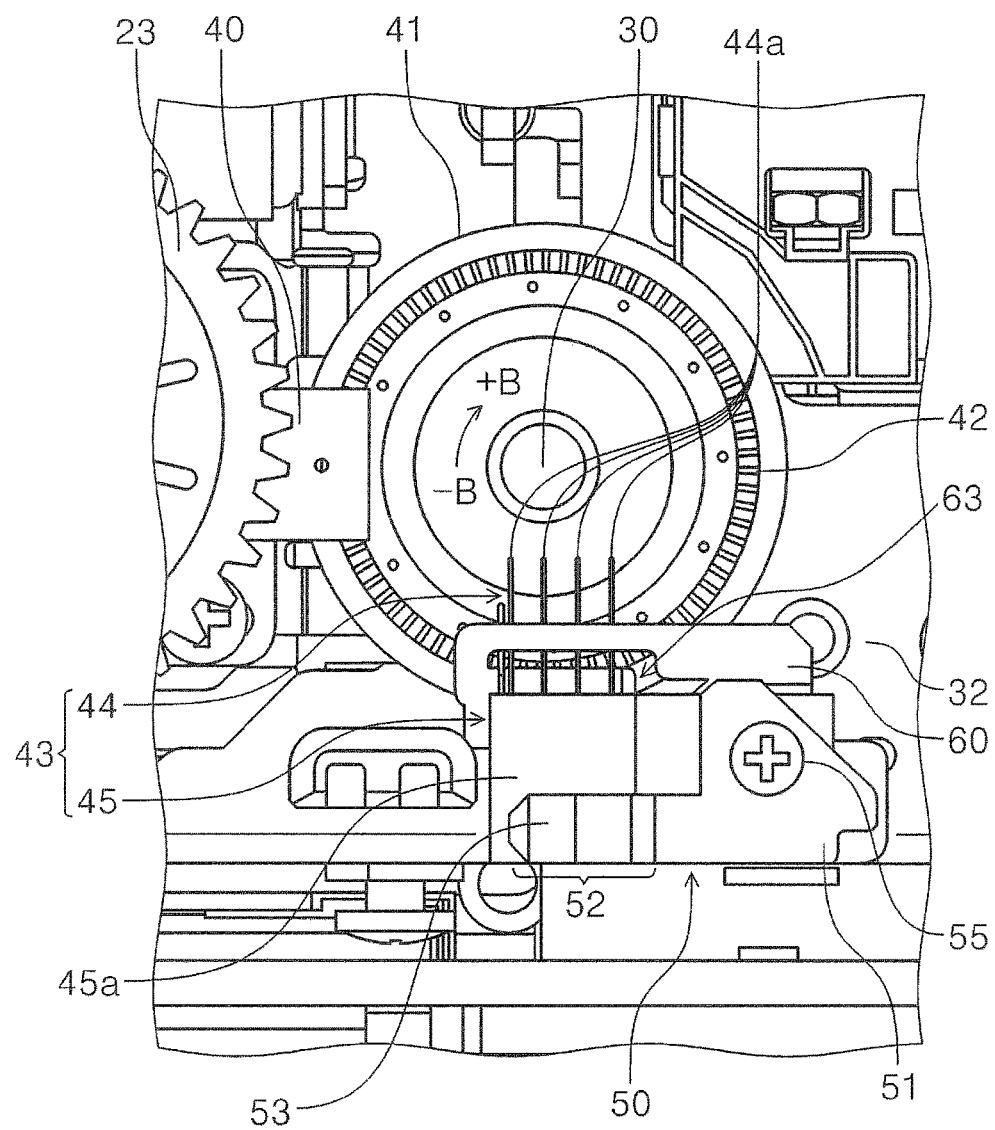
FIG. 6 is a front view of an encoder and an encoder scale.
Figure 7:
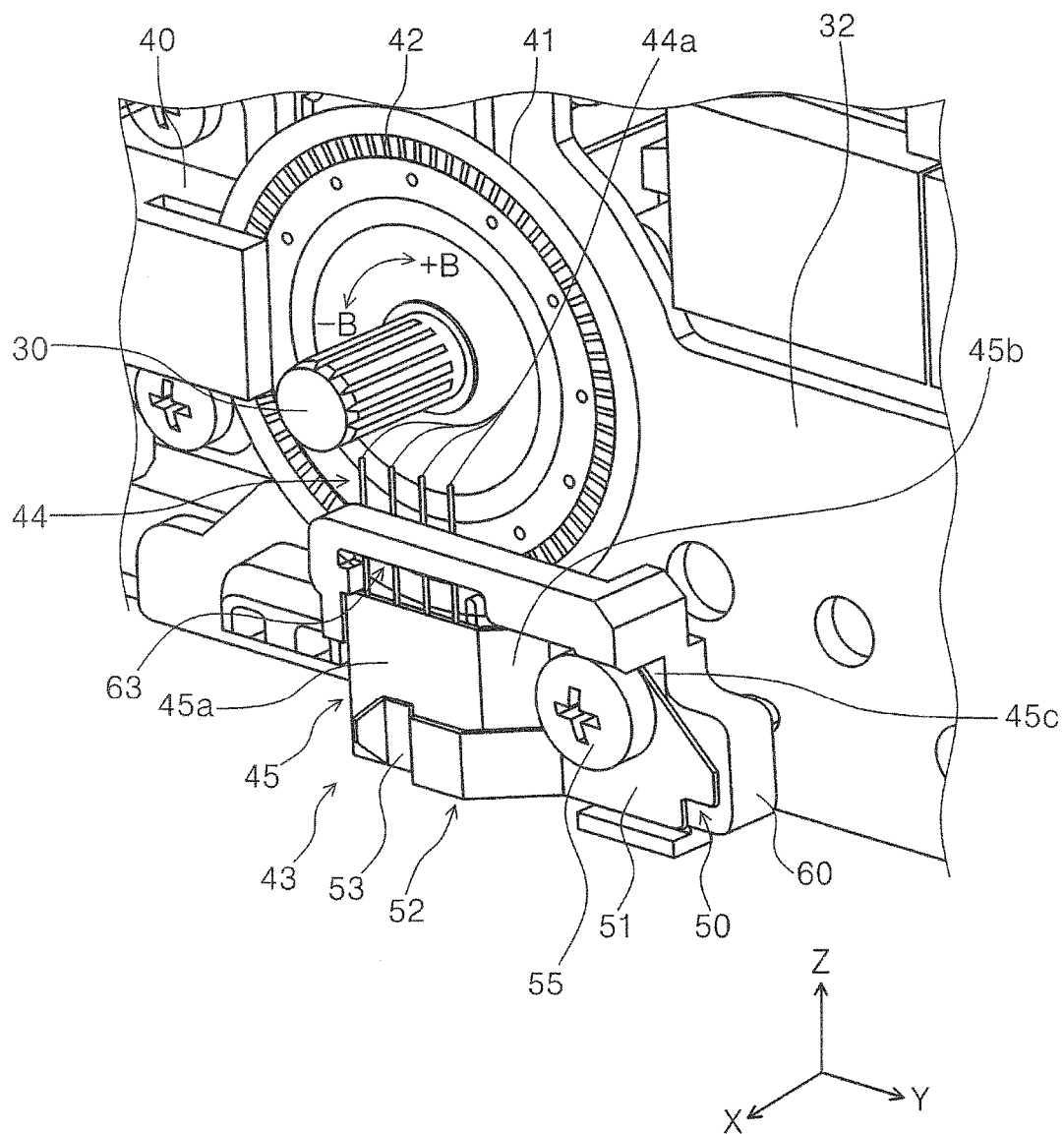
FIG. 7 is a perspective view of FIG. 6 viewed from another angle.
Figure 8:
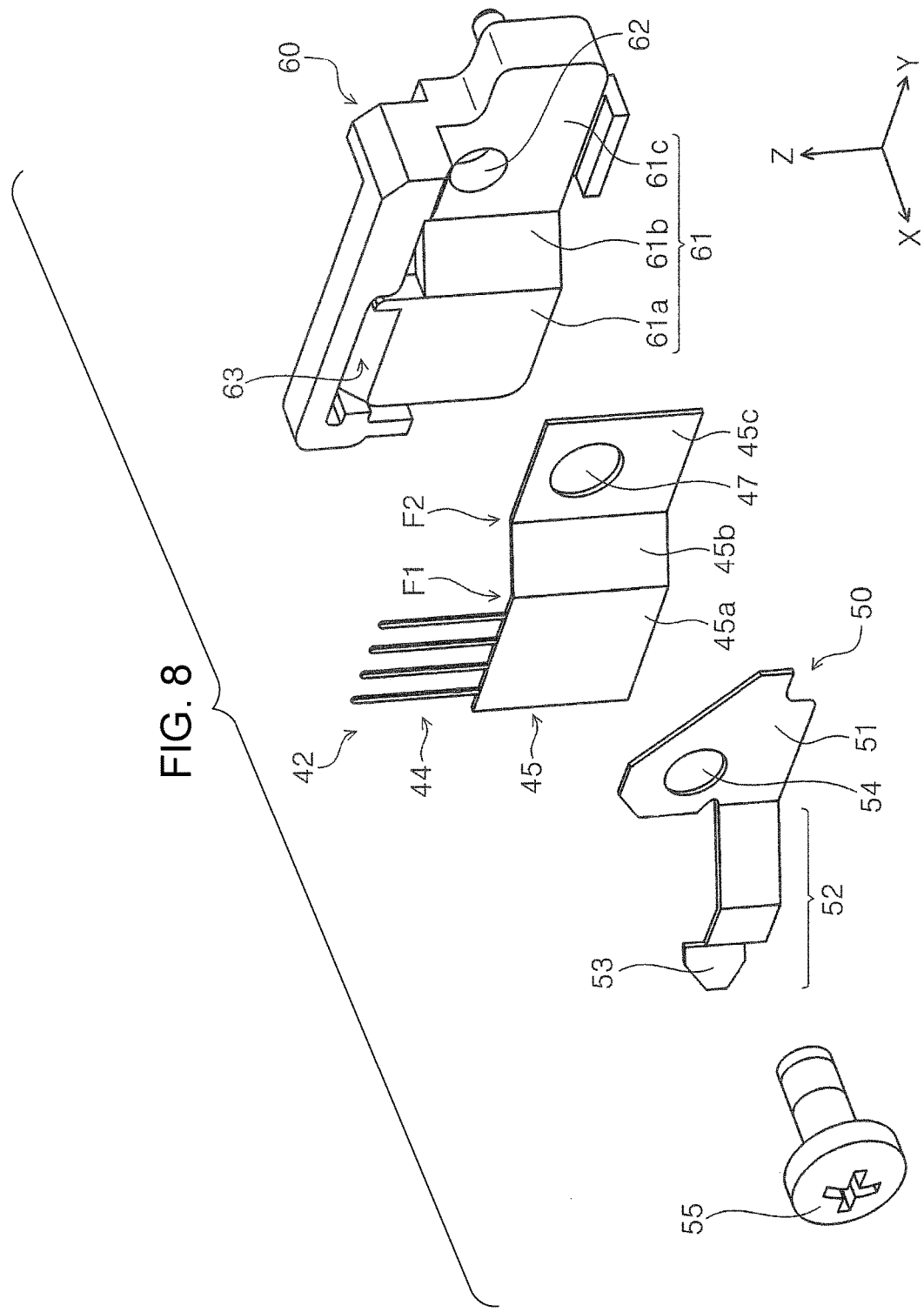
FIG. 8 is an exploded perspective view of an attachment configuration of an anti-static unit.
Figure 9:
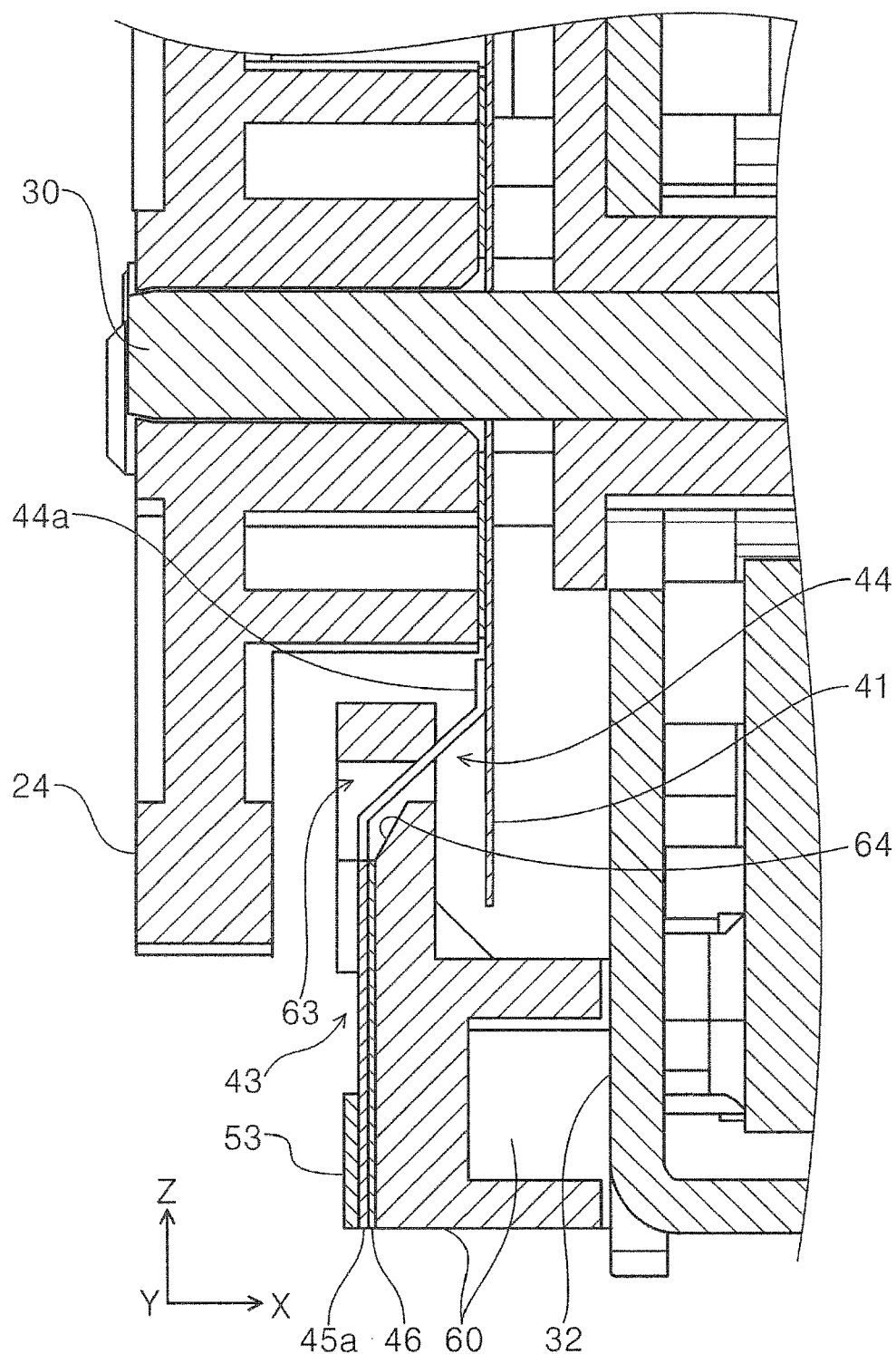
FIG. 9 is an enlarged view of an essential part in a cross-section taken along the line IX-IX of FIG. 5.

First, an outline of a recording apparatus according to one embodiment of the invention will be described. In the present embodiment, an ink jet printer 1 (hereinafter, simply referred to as a printer 1) will be described as an example of a recording apparatus. FIG. 1 is an outer appearance perspective view which illustrates an example of a printer according to the invention. FIG. 2 is a perspective view which illustrates the printer according to the invention, in which a first top cover and a paper output cover are open and a panel unit is pulled up. FIG. 3 is a perspective view which illustrates the printer according to the invention, in which a first top cover, a second top cover, and a paper output cover are open. FIG. 4 is a side cross-sectional view which illustrates a sheet transport path of the printer according to the invention. FIG. 5 is an inner configuration view in +X axis direction of an apparatus main body. FIG. 6 is a front view of an encoder and an encoder scale. FIG. 7 is a perspective view of FIG. 6 viewed from another angle. FIG. 8 is an exploded perspective view of an attachment configuration of an anti-static unit. FIG. 9 is an enlarged view of an essential part in a cross-section taken along the line IX-IX of FIG. 5.

In the X-Y-Z coordinate system shown in each drawing, the X direction is an apparatus width direction as well as a movement direction of a recording head. Further, the Y direction is a recording apparatus depth direction, and the Z direction is an apparatus height direction. Throughout the drawings, an apparatus front side or a front side is defined as +Y direction, and an apparatus rear side or a rear side is defined as −Y direction. Further, as viewed from the apparatus front side, the left side is defined as +X direction and the right side is defined as −X direction. Further, the apparatus upper side (including the upper part, top surface, and the like) is defined as +Z direction, and the apparatus lower side (including the lower part, bottom surface, and the like) is defined as −Z direction.

Overall Configuration of Printer

With reference to FIGS. 1 to 5, an overall configuration of a printer 1 will be described. The printer 1 (see FIG. 1) has an outer appearance made up of an apparatus main body 2 which houses a recording head 10 (FIG. 4) as a "recording section" that performs recording on a medium transported, a first top cover 3 and a second top cover 4 (see also FIG. 2) that openably close an upper part of the apparatus main body 2, a paper output cover 5 (see also FIG. 2) that openably closes a output unit 18 (FIG. 2) disposed on the front surface of the apparatus main body 2 (a side surface in the +Y direction), and a handle 6 which is rotatable with respect to the apparatus main body 2. The apparatus main body 2, the first top cover 3, the second top cover 4, the paper output cover 5 and the handle 6 can be made of a resin material such as plastics. Different resin materials can be used each member. Further, other materials (such as metal material) can be partially used.

As shown in FIG. 2, a paper feed port 7 is provided in the upper part of the apparatus main body 2 so that a paper sheet as "medium" is set to be inserted. The first top cover 3 is a cover that openably covers a region of the upper part of the apparatus main body 2 including the paper feed port 7, and as shown in FIGS. 2 and 4, assumes an inclined position when opened to support a paper sheet set in the paper feed port 7. Further, in the present example, a panel unit 9 through which operations for the printer 1 are input is provided in the upper part of the apparatus main body 2. The panel unit 9 has a liquid crystal display that displays various information such as menus and errors and operation buttons. The panel unit 9 is configured to be tilted so that the liquid crystal display can be pulled up forward in the printer 1 at least when the first top cover 3 is open (FIG. 2).

Further, the second top cover 4 is openably covers the other region of the upper part of the apparatus main body 2 than the region covered by the first top cover 3. When performing general recording, the printer 1 is used with the second top cover 4 closed (FIG. 2). As shown in FIG. 3, when the second top cover 4 is opened, the inside of the apparatus main body 2 is exposed through the opening 8 disposed in the upper part of the apparatus main body 2 so that the movement region of a carriage 11 which is provided with the recording head 10 is can be accessed, for example, for maintenance of the ink tank mounted on the carriage 11.

Paper Sheet Transport Path of Printer

Next, with reference mainly to FIG. 4, a paper sheet transport path in the printer 1 will be described. The dotted line indicated by the reference sign P in FIG. 4 represents a paper transport path. In the printer 1, a paper sheet is transported in the +Y direction in FIG. 4. In the following description, the direction (+Y direction) in which a paper sheet is transported is referred to as "downstream," and a direction opposite to the +Y direction (−Y direction) is referred to as "upstream."

In the apparatus main body 2, the carriage 11 which is provided with the recording head 10 (recording section) that performs recording by ejecting ink as the "liquid" onto the paper sheet is disposed so as to reciprocate in the width direction (X axis direction), which is perpendicular to the paper sheet transport direction (+Y direction). The bottom of the recording head 10 is provided with a nozzle row composed of a plurality of nozzles (not shown) that eject ink onto a paper sheet transported under the recording head 10, and ink is supplied from a liquid container 12 mounted in the carriage 11 through the nozzles.

The paper sheet set in the paper feed port 7 is fed downstream from the sheet feeding roller 14. The paper sheet fed by the sheet feeding roller 14 is transported to a recording region under the recording head 10 while being pinched by a transport roller pair 15 composed of a transport driving roller 15a that is driven by a motor 19 (see FIG. 5) which serves as a driving source and a transport driven roller 15b that rotates by driving the transport driving roller 15a.

A medium support section 16 is provided under the recording head 10 (−Z axis direction) so as to support the paper sheet which is transported and at least partially face the recording head 10. The medium support section 16 defines a paper sheet gap between a liquid ejection surface, which is the bottom of the recording head 10, and the paper sheet. Ink is ejected from the recording head 10 onto the paper sheet supported by the medium support section 16 to thereby perform recording. Detailed configuration of the medium support section 16 will be described later.

An output roller pair 17 which is composed of an output driving roller 17a that is driven by the motor 19 (FIG. 5) and the an output driven roller 17b that rotates by driving the output driving roller 17a is disposed downstream to the recording head 10. After transported on the medium support section 16 and recorded, the paper sheet is fed downstream by the output roller pair 17, output from the output unit 18, and loaded on the paper output cover 5 which is open. Thus, the inner structure of the printer 1 and the outline of the paper sheet transport path are described above.

As shown in FIG. 5, the transport driving roller 15a and the output driving roller 17a is driven by the common motor 19. The drive power of the motor 19 is transmitted from a first gear 21 disposed on a drive shaft 20 of the motor 19 via a second gear 22 and a third gear 23 to a fourth gear 24 disposed on a drive shaft 30 of the transport driving roller 15a. Then, the drive power of the motor 19 is further transmitted via a fifth gear 25, a sixth gear 26, and a seventh gear 27 to an eighth gear 28 disposed on a drive shaft 31 of the output driving roller 17a. An encoder 40 (FIG. 6) and an encoder scale 41 (FIG. 6) for detecting the displacement of the transport driving roller 15a are disposed at a position inside the fourth gear 24 that corresponds to the transport driving roller 15a in the apparatus width direction (+X axis direction, which is on the back side of the sheet of drawing in the direction perpendicular to the plane of FIG. 5).

Encoder and Encoder Scale and Their Peripheral Configuration

With reference to FIGS. 6 to 9, the encoder 40 and the encoder scale 41, and their peripheral configuration will be described. As previously mentioned, the encoder 40 (FIGS. 6 and 7) is configured to detect the motion (displacement) of the transport driving roller 15a. The transport driving roller 15a is a "movable section" which moves during recording onto a paper sheet by the recording head 10. The encoder scale 41 having a reading region 42 read by the encoder 40 is configured as a disc shaped rotary body, which is typically a rotary encoder scale. The encoder scale 41 is coaxially mounted on the drive shaft 30 with the transport driving roller 15a, and rotates in synchronization with the rotation of the transport driving roller 15a. The reading region 42 is provided in the circumferential direction of the encoder scale 41. Specifically, slits are disposed at an equal interval in the circumferential direction of the encoder scale 41.

The encoder 40 includes, as an example of a sensor, an optical sensor having a light receiving section, which is not shown in the figure, and a light emitting section. Light emitted from the light emitting section is received by the light receiving section via the slits of the reading region 42. Detection (receiving of light) by the light receiving section is on/off due to the slits provided and is output as a pulse signal so that the displacement of the transport driving roller 15a is detected. As shown in FIG. 6, the encoder 40 of the present embodiment is disposed at 9 o'clock position in plan view of the encoder scale 41.

When three openable members in the printer 1, that is, the first top cover 3, the second top cover 4, and the paper output cover 5 are open, the paper feed port 7 and the opening 8 on the top surface of the apparatus main body 2, and the output unit 18 on the front surface of the apparatus main body 2 are open. Since the paper feed port 7, the opening 8, and the output unit 18 are openings that communicate with the inside of the apparatus main body 2, there is a risk that dust and the like enter the apparatus main body 2 through the paper feed port 7, the opening 8 and the output unit 18 when the printer 1 is used outdoor. If the encoder scale 41 is electrically charged, dust or paper dust generated inside the apparatus main body 2 is likely to attach to the encoder scale 41, which may impair the detection accuracy of the encoder 40.

In order to prevent this problem, the encoder scale 41 includes an anti-static unit 43 that removes electric charges accumulated on the encoder scale 41 (FIGS. 6 and 7). Providing the anti-static unit 43 can reduce a risk that the encoder scale 41 is electrically charged and dust and the like is attached thereto.

The anti-static unit 43 includes an anti-static brush 44 that is in contact with the encoder scale 41 and a base 45 that holds the anti-static brush. The anti-static brush 44 is configured to be in contact with a region of the encoder scale 41 other than the reading region 42. The anti-static brush 44 and the base 45 are made of electrically conductive material. For example, a conductive metal such as aluminum can be used.

More specifically, a contact position of the anti-static brush 44 with the encoder scale 41 is provided inside the reading region 42, which extends in the circumferential direction of the encoder scale 41. Since the anti-static brush 44 has a tip 44a that is in contact with this position, the anti-static brush 44 (anti-static unit 43) can be easily in contact with the encoder scale 41 without interfering the encoder 40 reading the slits of the reading region 42.

The anti-static unit 43 is configured to be grounded to a main body frame 32 (FIG. 7) that constitutes the apparatus main body 2 having the recording head 10. More specifically, the base 45 that constitutes the anti-static unit 43 is attached to the main body frame 32 via a sheet metal member 50 (FIGS. 7 and 8) and a holder 60 (FIGS. 7 and 8). In the present embodiment, the sheet metal member 50 is fixed to the main body frame 32 via the holder 60 to hold at least part of the base 45 between the main body frame 32 and the sheet metal member 50.

The following describes a detailed attachment configuration of the anti-static unit 43 to the main body frame 32. The base 45 of the anti-static unit 43 is a thin plate made of an aluminum foil or the like. As shown in FIG. 8, a portion indicated by the reference sign F1 forms a mountain fold and a portion indicated by the reference sign F2 forms a valley fold when viewed from the +X axis side so that a first site 45a and a third site 45c are disposed offset in the X axis direction with a second site 45b interposed therebetween. The first site 45a is provided with the anti-static brush 44.

The base 45 is attached to the main body frame 32, that is, the holder 60 via an adhesive material 46 (FIG. 9) having adhesiveness. An attachment section 61 (see FIG. 8) of the holder 60 has a shape that corresponds to the base 45 (also see FIG. 8) having the first site 45a and the third site 45c offset in the X axis direction with the second site 45b interposed therebetween. That is, the first site 45a is adhered to the first attachment section 61a, and the second site 45b is adhered to the second attachment section 61b, and the third site 45c is adhered to the third attachment section 61c.

The sheet metal member 50 (see FIGS. 7 and 8) includes a fixation unit 51 that is fixed to the main body frame 32 via a screw 55 as a "fastener" to thereby hold part of the base 45 (third site 45c) between the main body frame 32 and the fixation unit 51, and an elastic portion 52 that is biased toward the main body frame 32 to press part of the base 45 other than the portion held between the main body frame 32 and the fixation unit 51. In the present embodiment, the elastic portion 52 is formed as a leaf spring. Further, in FIG. 8, the reference sign 54 in the sheet metal member 50, the reference sign 47 in the base 45, and the reference sign 62 in the holder are apertures through which each shaft of the respective screws 55 is inserted.

If the fixation unit 51 holding the base 45 between the holder 60 (main body frame 32) and the fixation unit 51 is fastened by the screw 55, the base 45 may be rotated or twisted by fastening operation. If the base 45 on which the anti-static brush 44 is disposed is rotated or twisted, the positional accuracy of the anti-static brush 44 is lowered. On the other hand, if the base 45 is attached to the holder 60 via the adhesive material 46, the anti-static brush 44 can be easily positioned but the adhesive material 46 may be peeled off.

In the present embodiment, a site of the base 45 held between the main body frame 32 and the fixation unit 51 is the third site 45c which is a portion of the base 45, and the third site 45c is a site spaced from the first site 45a on which the anti-static brush 44 is disposed. As a result, even if the third site 45c is slightly twisted by fastening the screw 55, it has little effect on the positional accuracy of the anti-static brush 44 and the anti-static unit 43 can be attached to the main body frame 32 with high accuracy.

In addition, as shown in FIG. 7, a portion of the base 45 (first site 45a) other than the third site 45c fixed by the fixation unit 51 is pressed by a press section 53 at the distal end of the elastic portion 52. This can prevent the adhesive material 46 (FIG. 9) from being peeled off. In the configuration of simply pressing the base 45 by the elastic portion 52, the base 45 can be prevented from being twisted unlike the case of fastening by the screw 55.

According to the above configuration, the anti-static unit 43 can be reliably attached to the main body frame 32, ensuring grounding of the encoder scale 41 with a simple configuration.

Holder

In the present embodiment, the holder 60 includes a guide 63 (FIGS. 8 and 9) that guides the tip 44a of the anti-static brush 44 toward the encoder scale 41. As previously described, the base 45 is attached to the attachment section 61, which is a surface of the holder 60 in the −X axis direction. As shown in FIG. 9, the guide 63 is provided as an opening that communicates in the X axis direction so as to allow the anti-static brush 44 to pass through the guide 63, guiding the tip 44a of the anti-static brush 44 to the +X axis side of the holder 60. The guide 63 has a bevel 64 (also, FIG. 9) to guide the tip 44a of the anti-static brush 44 toward the encoder scale 41. According to this configuration, the tip 44a of the anti-static brush 44 can be reliably in contact with the encoder scale 41.

Guided by the guide 63, the anti-static brush 44 assumes a substantially S-shape as shown in FIG. 9 with the proximal end of the anti-static brush 44 (close to the base 45) being located on the −X axis side of the holder 60 and the tip 44a being located on the +X axis side. As a result, a force in the direction in which the holder 60 is peeled off from the attachment section 61 may be applied on the first site 45a of the base 45. However, since the first site 45a is pressed by the press section 53, the first site 45a can be prevented from being peeled off from the holder 60.

Orientation of Anti-Static Brush

In the present embodiment, the transport driving roller 15a having the displacement that is detected by the encoder 40 is configured to be rotatable in both the direction (+Y axis direction) in which the paper sheet is transported (rotation in the +B direction indicated by the double-sided arrow in FIG. 6) and the opposite direction (rotation in the −B direction indicated by the double-sided arrow in FIG. 6). Accordingly, the encoder scale 41, which rotates following the rotation of the transport driving roller 15a, is also configured to be rotatable in the +B direction (first direction) in FIG. 6 and the −B direction (second direction) opposite to the +B direction.

The anti-static brush 44 is disposed at the orientation that does not interfere with the encoder scale 41 rotating in either the +B direction (first direction) or the −B direction (second direction). Specifically, as shown in FIG. 6, the extending direction of the anti-static brush 44 is substantially perpendicular to the rotation direction of the encoder scale 41 when the anti-static brush 44 is in contact with the encoder scale 41. In the present embodiment, the anti-static brush 44 is disposed at a 6 o'clock position of the encoder scale 41. The rotation direction of the encoder scale 41 at the 6 o'clock position is a direction substantially along the tangent direction at this position, that is, the Y axis direction. Therefore, the anti-static brush 44 is disposed so that the brush extends in the Z axis direction.

Providing the anti-static brush 44 in this manner enables the configuration in which the anti-static brush 44 is not likely to interfere with the encoder scale 41 rotating in either the +B direction (first direction) or the −B direction (second direction), thereby ensuring smooth rotation of the encoder scale 41.

Although the anti-static unit 43 may be directly attached to the main body frame 32, it has an increased degree of freedom in design such as arrangement and shape of the anti-static unit 43 and the main body frame 32 when attached via the holder 60. Further, in addition to the rotary encoder of the present embodiment, the anti-static unit 43 can also be disposed for a linear encoder scale (not shown in the figure) that detects the movement distance of the carriage 11 (FIG. 4) moving in the apparatus width direction, for example.

Other Configurations of Printer

Configurations of Medium Support Section

Figure 10:
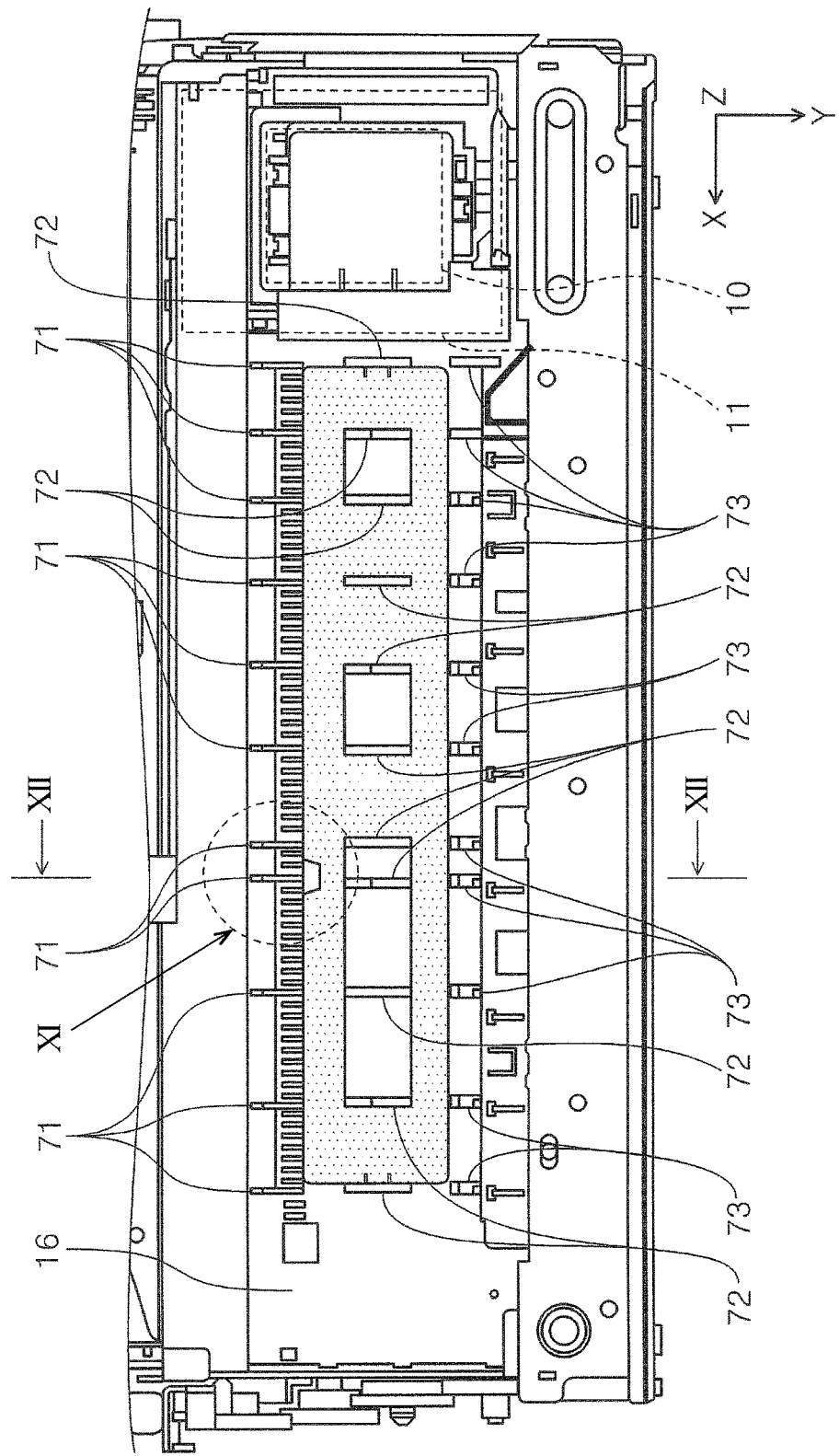
FIG. 10 is a plan view of a medium support section.
Figure 11:
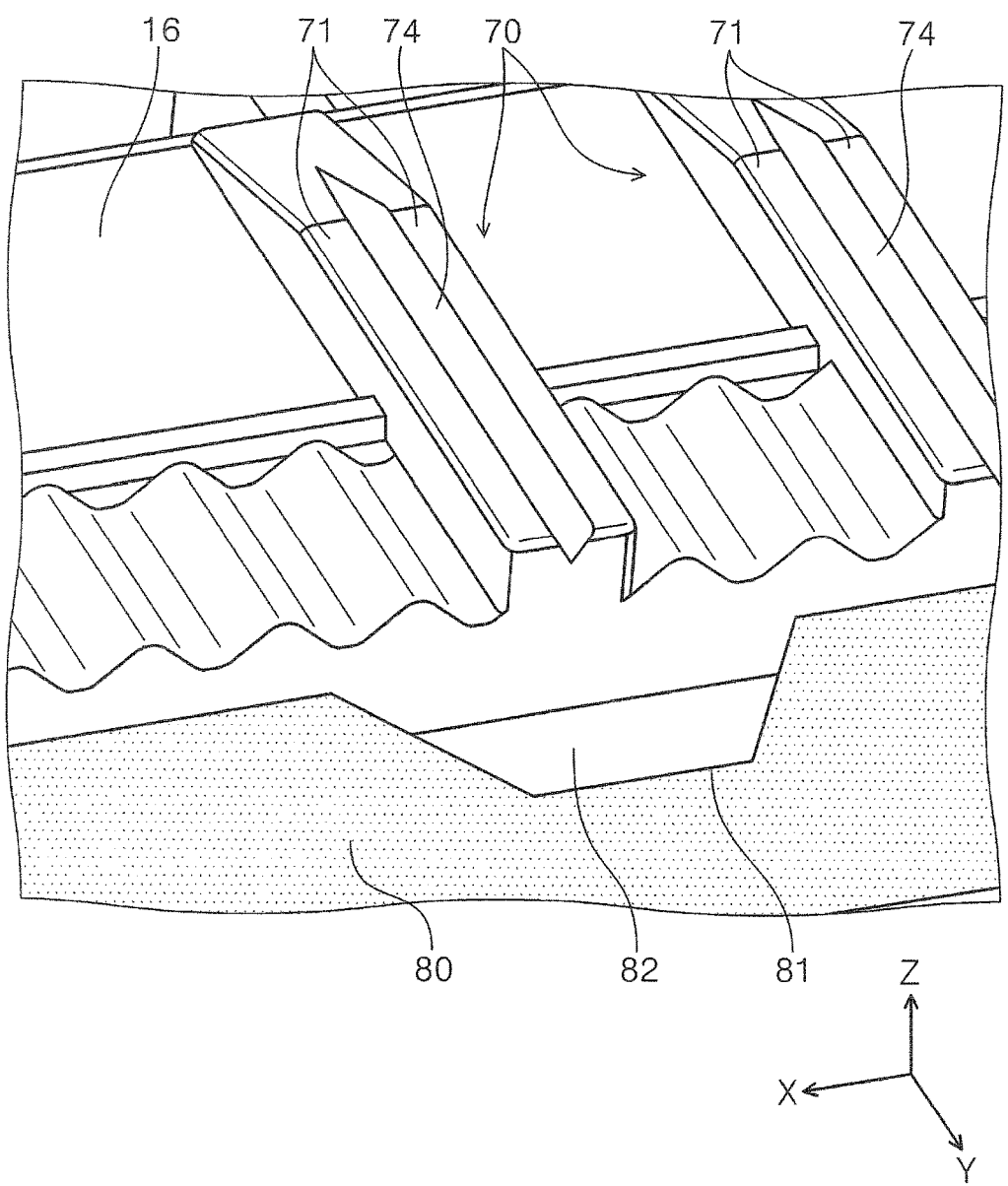
FIG. 11 is an enlarged perspective view of an essential part of a region XI shown in FIG. 10.
Figure 12:
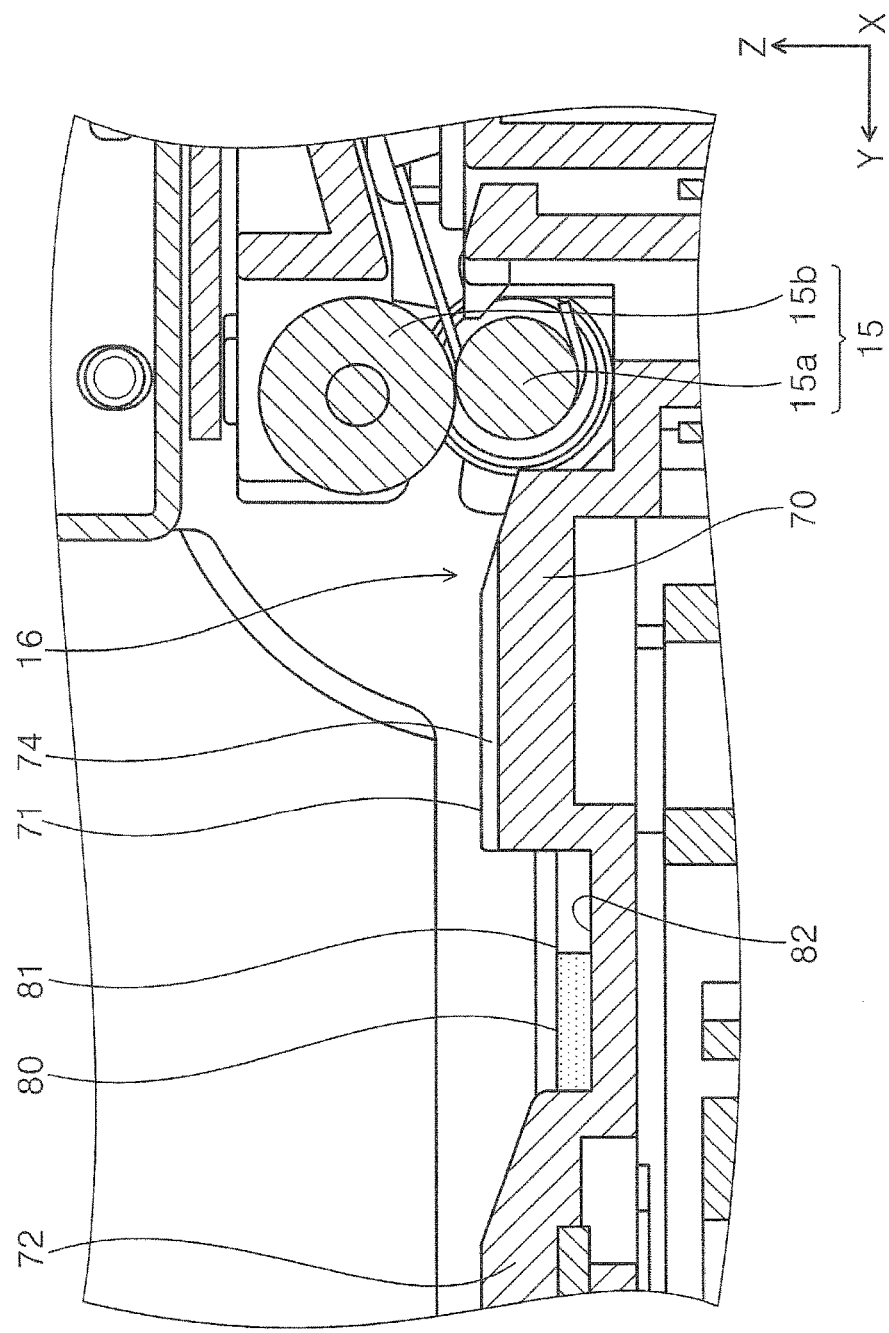
FIG. 12 is a cross sectional view taken along the line XII-XII of FIG. 10.
Figure 13:
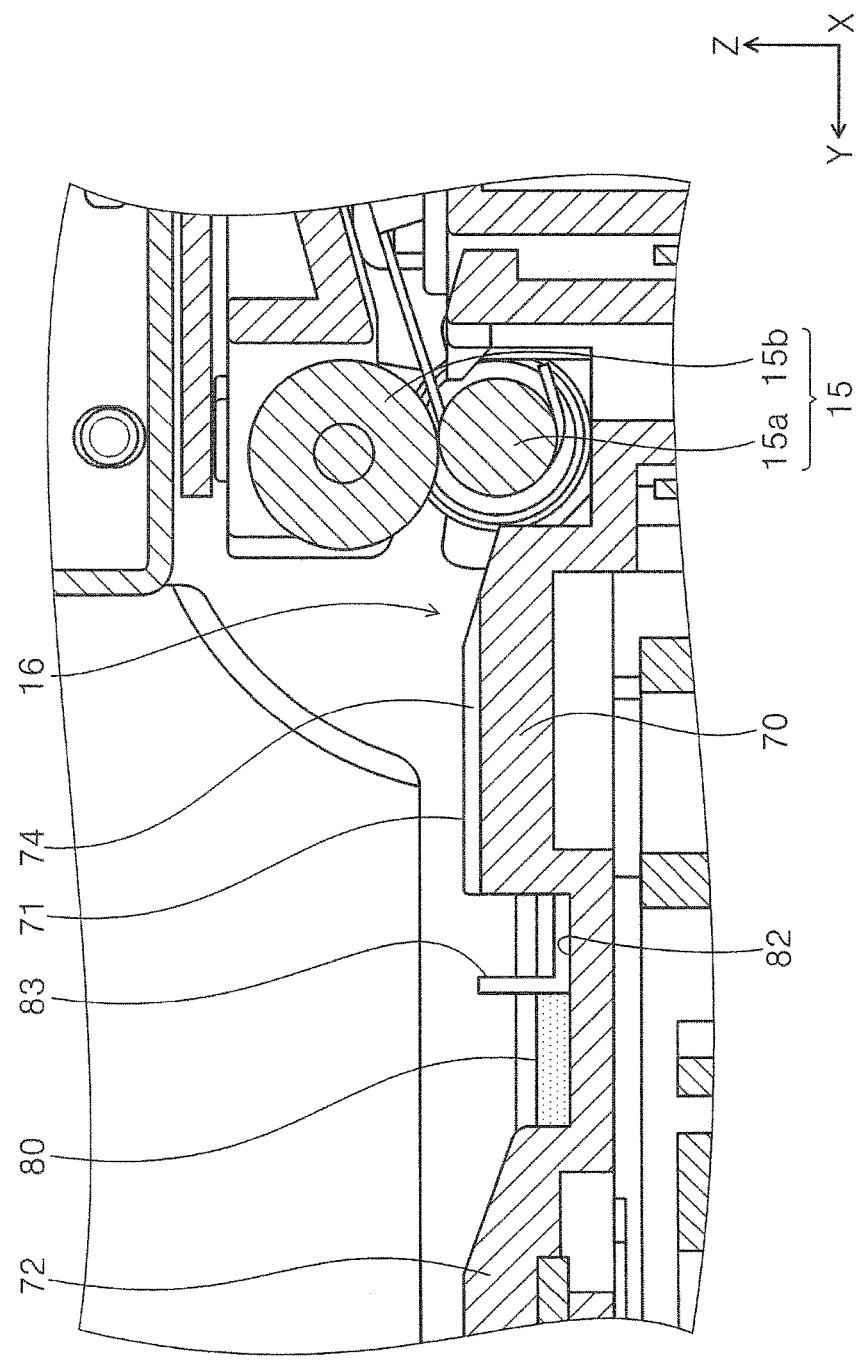
FIG. 13 is a view which illustrates another example of a medium support section.
Figure 14:
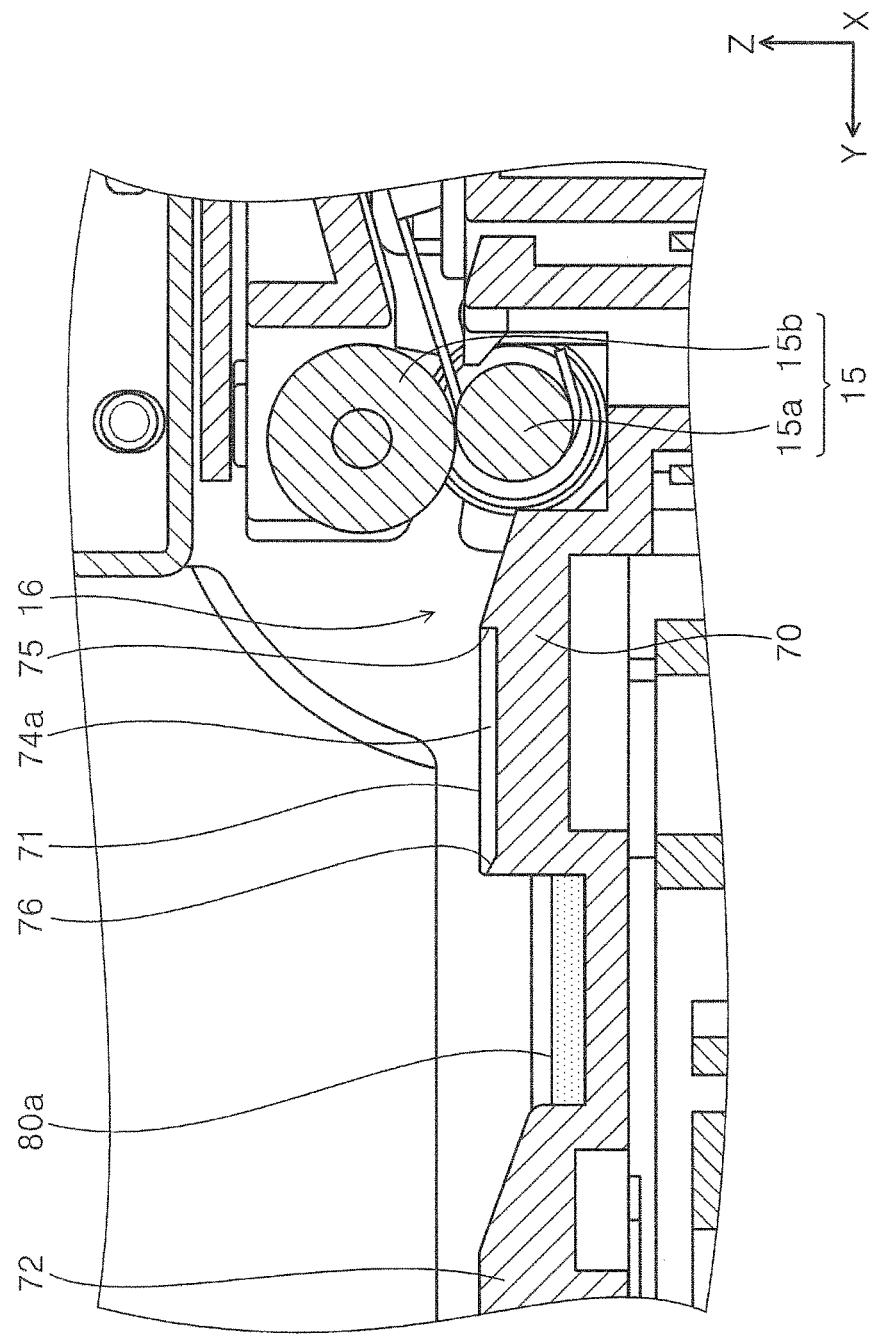
FIG. 14 is a view which illustrates another example of a medium support section.
Figure 15:
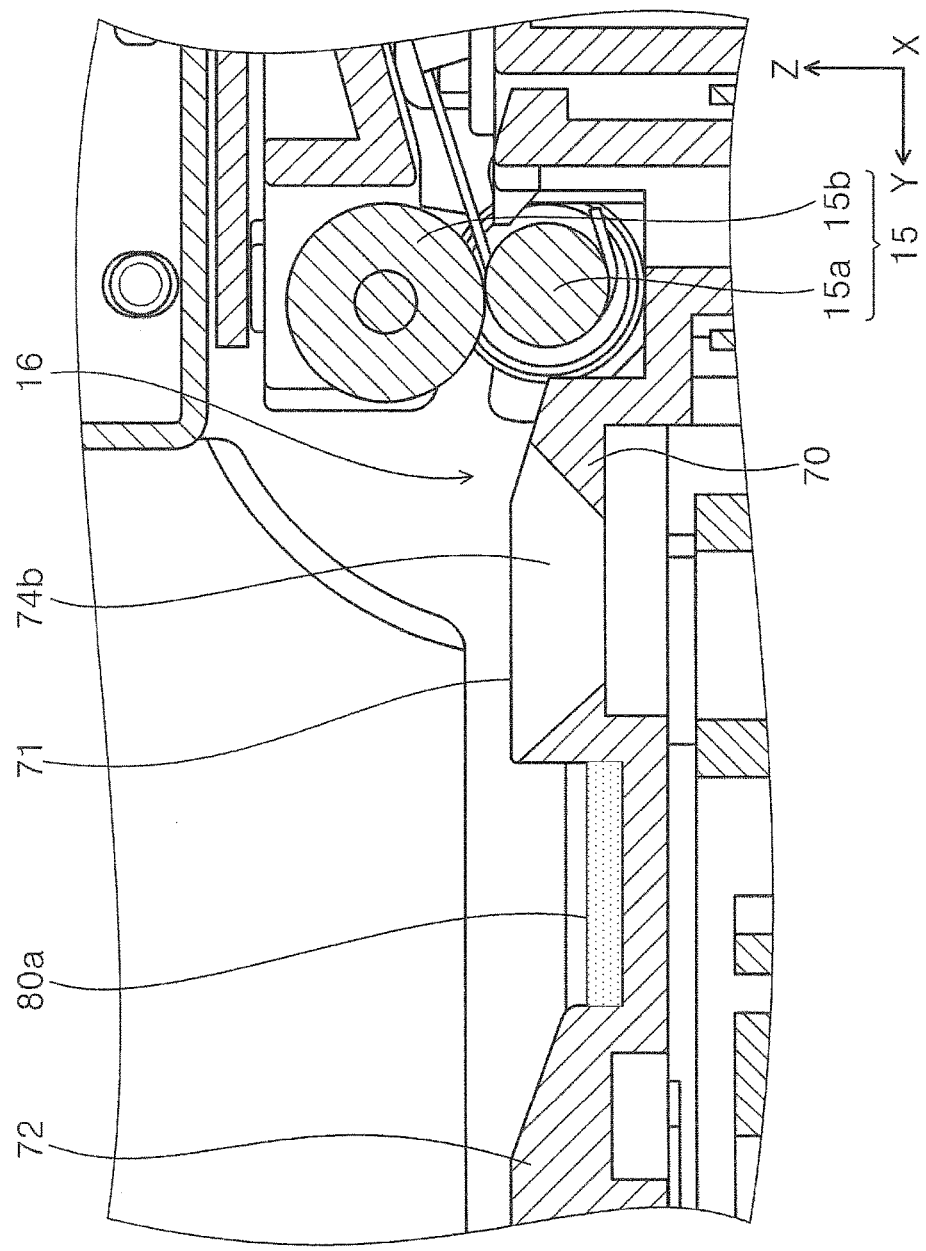
FIG. 15 is a view which illustrates another example of a medium support section.
Figure 16:
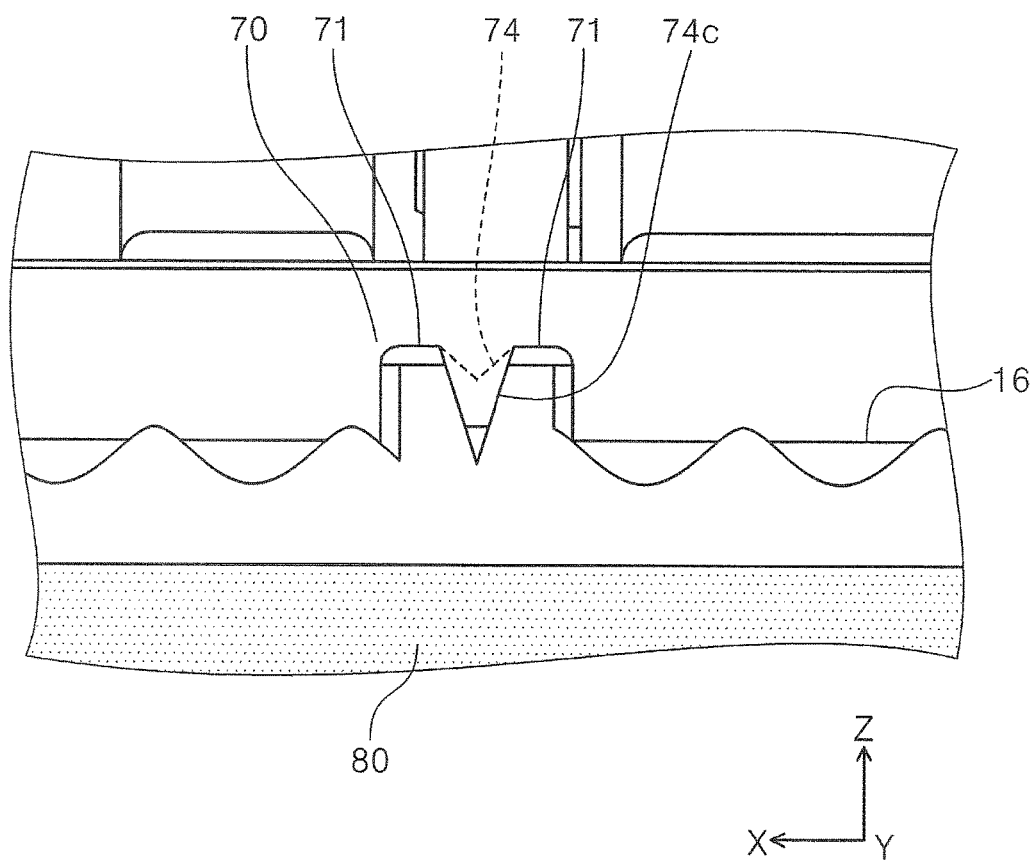
FIG. 16 is a view which illustrates another example of a medium support section.

Referring to FIGS. 10 to 16, a configuration of the medium support section 16 will be described. FIG. 10 is a plan view of a medium support section. FIG. 11 is an enlarged perspective view of an essential part of a region XI shown in FIG. 10. FIG. 12 is a cross-sectional view taken along the line XII-XII of FIG. 10. FIG. 13 is a view which illustrates another example of the medium support section. FIG. 14 is a view which illustrates another example of the medium support section. FIG. 15 is a view which illustrates another example of the medium support section. FIG. 16 is a view which illustrates another example of the medium support section.

As shown in FIG. 10, the medium support section 16 that supports a paper sheet at a position facing the recording head 10 includes a first rib 70 as a plurality of "support ribs" spaced from each other in the width direction (X axis direction) which is perpendicular to the medium transport direction. The first rib 70 has a support surface 71 for supporting a paper sheet. Further, second ribs 72 and third ribs 73 extending along the medium transport direction (+Y axis direction) are disposed downstream to the respective first ribs 70. A paper sheet is supported from the underside by the first ribs 70, the second ribs 72, and the third ribs 73. In FIG. 10, the reference signs 10 and 11 indicated by the dotted line indicate the recording head 10 and the carriage 11 located at a home position.

An absorbing member 80 that absorbs ink ejected from the recording head 10 is disposed downstream in the medium transport direction of the first rib 70 and the second rib 72. The absorbing member 80 is made of a porous body formed of a foam resin such as a urethane foam, sponge, or a fiber material such as felt.

The first rib 70 includes a channel 74 extending in the Y axis direction, which is the medium transport direction, on the support surface 71 (FIG. 11). The channel 74 causes the light emitted from a medium detecting optical sensor, which is not shown in the figure, mounted on the carriage 11 to be irregularly reflected. A role of the channel 74 will be described below. The medium detecting optical sensor includes a light emitting section that emits light toward the medium support section 16 and a light receiving section that receives the reflected light. When a paper sheet is transported on the medium support section 16, light emitted from the light emitting section is reflected by the paper sheet and almost all the reflected light is incident on the light receiving section. On the other hand, when the paper sheet is not present on the medium support section 16, light emitted from the light emitting section is irregularly reflected by the inner wall of the channel 74. Since part of the irregularly reflected light is incident on the light receiving section but others are not, the amount of light received by the light receiving section when the paper sheet is not present on the medium support section 16 is smaller than that when the paper sheet is present on the medium support section 16. This difference in the light receiving amount enables detection of presence or absence of the paper sheet on the medium support section 16.

Since the channel 74 is formed on the support surface 71 of the first rib 70, paper dust generated from the paper sheet transported may accumulate in the channel 74. When a certain amount of paper dust accumulates in the channel 74, it may be dragged by the paper sheet transported on the support surface 71 and fall on the absorbing member 80 located downstream (+Y axis direction) in the transport direction. If a lump of paper dust falls on the absorbing member 80, ink which has been absorbed in the absorbing member 80 is absorbed by the lump of paper dust, and may smudge the back surface of the paper sheet transported when it is in contact with the back surface.

In order to overcome these disadvantages, the absorbing member 80 includes a notch 81 at a position corresponding to the first rib 70 having the channel 74 in the width direction (X axis direction) on the upstream side in the medium transport direction (−Y axis direction). In the present embodiment, the notch 81 is provided at a position corresponding the first rib 70 located at the fourth position from the left in FIG. 10. Providing the notch 81 forms a recess 82 between the first rib 70 and the absorbing member 80 (FIGS. 11 and 12). With this configuration, paper dust which falls from the channel 74 on the downstream side in the medium transport direction (+Y axis side) is received by the recess 82. Accordingly, a risk that paper dust which falls from the channel 74 is directly in contact with the absorbing member 80 and absorbs ink can be reduced. As a result, a risk of smudging the back surface of the paper sheet transported can be reduced.

The notch 81 can also be formed at positions corresponding to all the first ribs 70 having the channel 74. However, if there is the channel 74 in which paper dust is particularly likely to accumulate for the reasons of positional relationship between the transport roller pair 15 and the respective channels 74, size of the paper sheet that is frequently used, and the like, the notch 81 is preferably formed only at a position corresponding to the specific channel 74 as the present embodiment. For example, a plurality of transport roller pairs 15 (FIG. 12) disposed upstream to the medium support section 16 is typically arranged with an interval in the width direction (X axis direction). The paper sheet transported by the plurality of transport roller pairs 15 arranged with an interval in the width direction becomes a wavy state having portions nipped by the transport roller pairs 15 curved downward in the width direction. Accordingly, as shown in FIG. 12, the paper sheet is likely to be pressed against the first rib 70 that overlaps with the transport roller pair 15 in the X axis direction, and thus paper dust is likely to accumulate in the channel 74. Therefore, the notch 81 is preferably formed at a position corresponding to the first rib 70 that overlaps with the transport roller pair 15 in the X axis direction.

If many notches 81 are provided, there is a risk of decrease in absorbing ability by the absorbing member 80, leading to generation of mist. On the other hand, providing the notch 81 only at a position corresponding to the channel 74 in which paper dust is likely to accumulate can minimize a risk of mist generation. In the present embodiment, the notch 81 is formed corresponding to the channel 74 in which paper dust is likely to accumulate when a paper sheet of a frequently used size (for example, 788 mm×1091 mm) is transported.

Further, as shown in FIG. 13, a wall shaped regulation section 83 may be provided downstream to the recess 82. By providing the regulation section 83, paper dust which falls in the recess 82 can be effectively prevented from being in contact with the absorbing member 80.

Further, in the channel 74 shown in FIG. 11, an upstream end and a downstream end in the medium transport direction are both open, which may cause paper dust accumulated in the channel 74 to fall on the upstream or downstream side in the medium transport direction. However, in a channel 74*a* shown in FIG. 14, an upstream regulation section 75 and a downstream regulation section 76 are formed on both ends of the channel, which enables a configuration that prevents paper dust accumulated in the channel 74*a* from easily falling. Although the notch 81 is not provided on the absorbing member 80 in FIG. 14, the notch 81 can also be formed. Further, the downstream regulation section 76 is formed as a bevel to promote falling of paper dust accumulated in the channel 74*a* on the downstream side in the medium transport direction.

Further, in a channel 74*b* shown in FIG. 15, part of the channel 74*b* is formed as a through hole, which enables a configuration in which paper dust falls under the first rib 70 and does not accumulate in the channel 74*b*.

Further, in a channel 74*c* shown in FIG. 16, a deeper channel can be formed to thereby reduce a risk that paper dust falls on the downstream side in the medium transport direction. The reference sign 74 in FIG. 16 refers to the channel 74 in FIG. 11. The channel 74*c* has a depth larger than that of the channel 74 shown in FIG. 11 so that much paper dust can accumulate in the channel to thereby reduce a risk that paper dust falls on the downstream side in the medium transport direction.

Flap of Paper Feed Port

Figure 17:
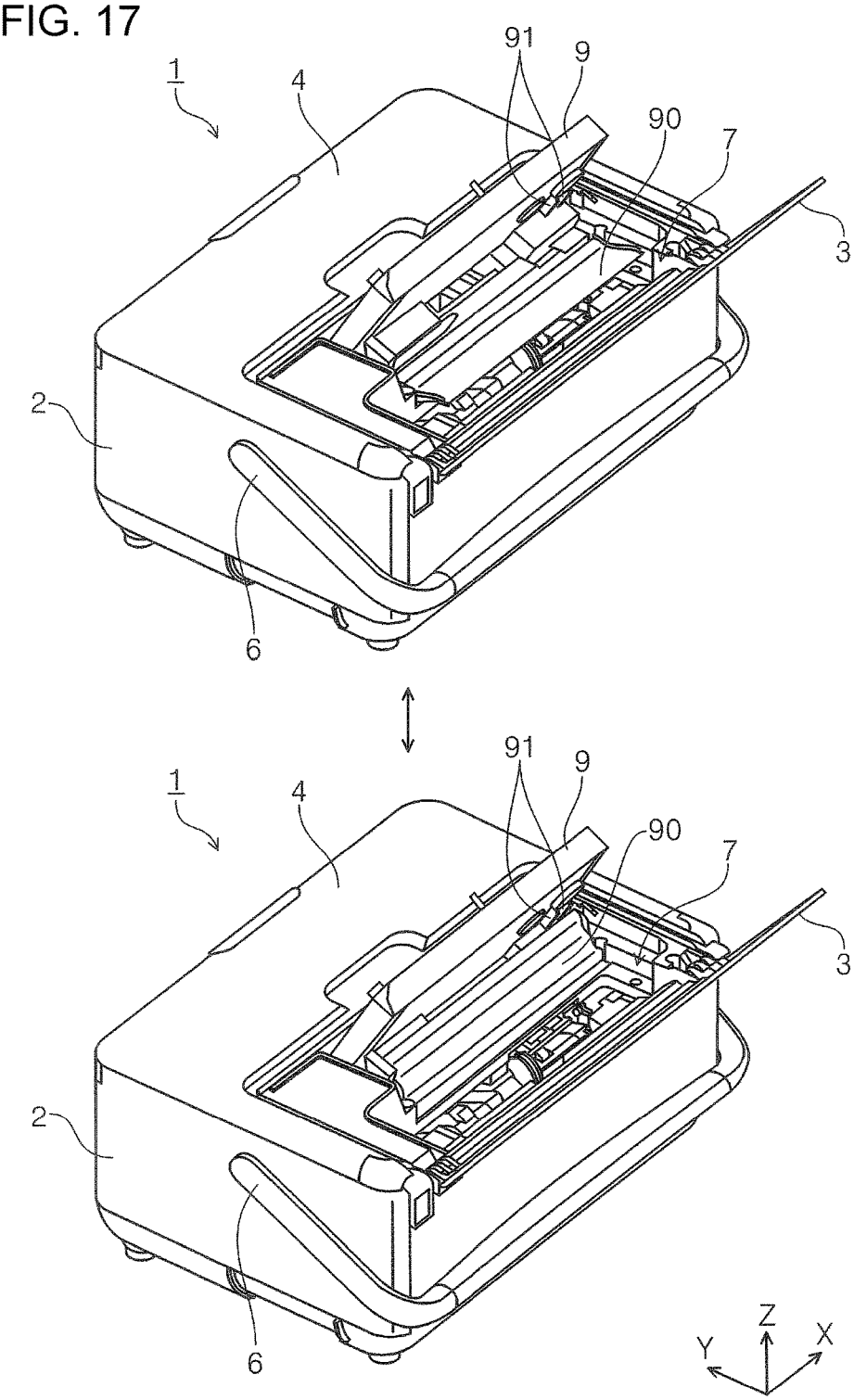
FIG. 17 is a view which illustrates an operation of a flap disposed at a paper feed port.
Figure 18:
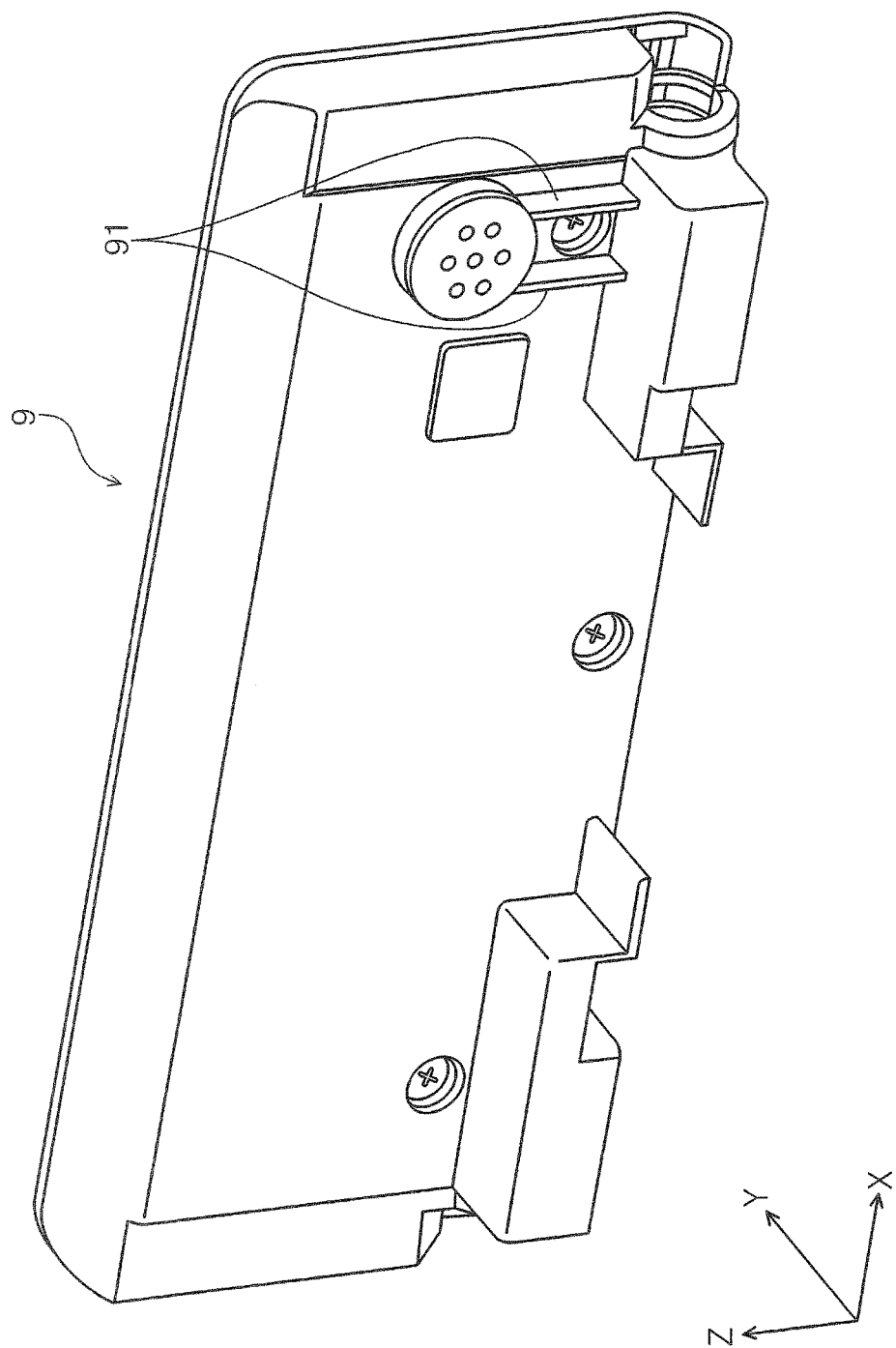
FIG. 18 is a perspective view as viewed from a rear side of a panel unit.

With reference to FIGS. 17 to 19, a flap 90 disposed at the paper feed port 7 will be described. FIG. 17 is a view which illustrates an operation of a flap disposed at a paper feed port. FIG. 18 is a perspective view as viewed from a rear side of a panel unit. FIG. 19 is a view which illustrates a closing operation of the flap in coordination with a closing operation of the panel unit.

As previously described, the panel unit 9 is tiltable to be pulled up forward in the printer 1 when recording is performed in the printer 1, that is, when the first top cover 3 is open to expose the paper feed port 7 for a paper sheet (see FIG. 2 as well as FIG. 17). When the panel unit 9 is pulled up as shown in FIG. 17, the paper feed port 7 is wide open, which permits dust and the like to easily enter the inside of the apparatus main body 2.

The flap 90 that openably closes part of the paper feed port 7 is provided at the paper feed port 7 of the printer 1. The flap 90 opens by rotating about a rotation shaft 90*a* (FIG. 19). When the flap 90 is closed as shown in the upper view in FIG. 17, part of the paper feed port 7 is covered so that an opening area that communicates with the inside of the apparatus main body 2 is reduced. When in normal use, that is, when recording is performed by setting a paper sheet in the paper feed port 7, the flap 90 can be in a closed state (upper view in FIG. 17) to thereby prevent dust from entering the inside of the apparatus main body 2 through the paper feed port 7.

The flap 90 can be in an open state as shown in the lower view in FIG. 17 when the panel unit 9 is open. When the flap 90 is open, the paper feed port 7 is exposed. For example, for removing paper jam or performing maintenance around the paper feed port 7, the flap 90 may be in an open state to improve operationability.

Further, the flap 90 is configured to be closed in coordination with a closing operation of the panel unit 9. Ribs 91 (FIG. 18) are provided on the rear side (−Y axis direction) of the panel unit 9. When the flap 90 is in an open state, the distal end of the flap 90 is in contact with the rib 91 (the upper view in FIG. 19). In FIG. 19, the reference sign 9*a* indicates a rotation shaft of the panel unit 9. Both the rotation shaft 9*a* of the panel unit 9 and the rotation shaft 90*a* of the flap 90 are disposed to extend in the X axis direction. Accordingly, the panel unit 9 and the flap 90 are configured to open in the same direction.

When the panel unit 9 rotates in the closing direction, the ribs 91 press the distal end of the flap 90 in the closing direction of the flap 90. When the panel unit 9 becomes a closed state, the flap 90 also becomes a closed state (lower view in FIG. 19). In the present embodiment, the panel unit 9 is configured to open at any angle by a free-stop mechanism, not shown in the figure. The flap 90 is configured to close by its weight when the flap 90 pressed by the rib 91 of the panel unit 9 becomes a certain open angle. Further, the flap 90 can be moved by hand from an open state to a closed state while the panel unit 9 is held in an open state.

The entire disclosure of Japanese Patent Application No. 2017-033443, filed Feb. 24, 2017 is expressly incorporated by reference herein.

What is claimed is:

1. A recording apparatus comprising:
   a recording section that performs recording onto a medium transported;
   an encoder that detects a motion of a movable section that operates during recording performed by the recording section onto a medium;
   an encoder scale having a reading region that is read by the encoder; and
   an anti-static unit having an anti-static brush that is in contact with the encoder scale and a base that holds the anti-static brush, wherein
   the anti-static brush is in contact with a portion of the encoder scale other than the reading region.

2. The recording apparatus according to claim 1, further comprising:

a main body frame that constitutes an apparatus main body having the recording section; and a sheet metal member that holds at least part of the base between the main body frame and the sheet metal member, and is fixed to the main body frame.

3. The recording apparatus according to claim 2, wherein the base is attached to the main body frame by an adhesive material having adhesiveness, and the sheet metal member includes:

a fixation unit that holds part of the base between the main body frame and the sheet metal member, and is fixed to the main body frame by a fastener; and an elastic portion that is biased toward the main body frame to press part of the base other than the portion held between the main body frame and the fixation unit.

4. The recording apparatus according to claim 3, further comprising:

a holder to which the base is attached via an adhesive material, wherein the anti-static unit is attached to the apparatus main body with the holder interposed therebetween.

5. The recording apparatus according to claim 4, wherein the holder includes a guide that guides a tip of the anti-static brush toward the encoder scale.

6. The recording apparatus according to claim 1, wherein the encoder scale is formed as a disc shaped rotary body.

7. The recording apparatus according to claim 6, wherein the reading region of the encoder scale is provided in a circumferential direction, and a contact position of the anti-static brush with the encoder scale is provided inside the reading region.

8. The recording apparatus according to claim 7, wherein the encoder scale is rotatable in a first direction and a second direction opposite to the first direction, and the anti-static brush is disposed at an orientation that does not interfere with the encoder scale rotating in either the first direction or the second direction.

9. The recording apparatus according to claim 1, further comprising:

a medium support section that supports the medium, and at least partially faces the recording section;

a plurality of support ribs disposed on the medium support section and has a support surface for the medium, the support ribs being disposed spaced from each other in a width direction which is perpendicular to a medium transport direction; and an absorbing member disposed downstream to the plurality of the support ribs in the medium transport direction to absorb the liquid ejected from the recording section, wherein at least one support rib includes a channel which extends in the medium transport direction on the support surface, and the absorbing member includes a notch at a position corresponding to the support rib having a channel in the width direction on an upstream side in the medium transport direction.

* * * * *